US008644190B2

(12) United States Patent
Sachs et al.

(10) Patent No.: US 8,644,190 B2
(45) Date of Patent: Feb. 4, 2014

(54) APPARATUS AND METHOD FOR NETWORK ACCESS DISCOVERY AND SELECTION

(75) Inventors: Joachim Sachs, Aachen (DE); Petter Arvidsson, Bromma (SE); Johan Rune, Lidingö (SE); Zoltán Richárd Turányi, Szentendre (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 236 days.

(21) Appl. No.: 12/864,202

(22) PCT Filed: Jan. 20, 2009

(86) PCT No.: PCT/EP2009/050601
§ 371 (c)(1),
(2), (4) Date: Jul. 22, 2010

(87) PCT Pub. No.: WO2009/095336
PCT Pub. Date: Aug. 6, 2009

(65) Prior Publication Data
US 2010/0296415 A1    Nov. 25, 2010

Related U.S. Application Data

(60) Provisional application No. 61/023,953, filed on Jan. 28, 2008.

(51) Int. Cl.
*H04L 12/28* (2006.01)
(52) U.S. Cl.
USPC ........... 370/254; 370/310; 370/328; 370/331; 455/452.2

(58) Field of Classification Search
USPC ......... 370/254, 310, 315, 328, 331, 342, 345, 370/347; 455/435.3, 452.2, 509, 512, 552.1
See application file for complete search history.

(56) References Cited

U.S. PATENT DOCUMENTS

| 7,065,367 B2 * | 6/2006 | Michaelis et al. ......... 455/452.2 |
| 2004/0009751 A1 * | 1/2004 | Michaelis et al. ............. 455/62 |

(Continued)

FOREIGN PATENT DOCUMENTS

| WO | 02/39759 A2 | 5/2002 |
| WO | 2004/008793 A1 | 1/2004 |

(Continued)

OTHER PUBLICATIONS

3rd Generation Partnership Project. 3GPP TS 23.402, V8.0.0 (Dec. 2007). 3rd Generation Partnership Project; Technical Specification Group Services and System Aspects; Architecture enhancements for non-3GPP accesses (Release 8). Dec. 2007.

*Primary Examiner* — Hassan Phillips
*Assistant Examiner* — Ajay Cattungal
(74) *Attorney, Agent, or Firm* — Coats & Bennett, P.L.L.C.

(57) ABSTRACT

A method is provided for use in a communications network in which a plurality of accesses are available to a user entity for accessing a network resource, comprising: determining a set of active rules, each rule specifying respective preferences, at least relatively, for at least some of the plurality of accesses, with potential for conflict between the rules of the set concerning which access is most preferred; deriving from the set of active rules network discovery and selection rules a new rule specifying respective preferences, at least relatively, for at least some of the plurality of accesses; and selecting an access for use by the user entity based on the new rule.

13 Claims, 13 Drawing Sheets

(56) References Cited

U.S. PATENT DOCUMENTS

| | | | |
|---|---|---|---|
| 2004/0142693 A1* | 7/2004 | Feder et al. | 455/443 |
| 2007/0089161 A1 | 4/2007 | Waris | |
| 2009/0059814 A1* | 3/2009 | Nixon et al. | 370/254 |
| 2010/0003980 A1* | 1/2010 | Rune et al. | 455/436 |
| 2011/0092208 A1* | 4/2011 | Swaminathan et al. | 455/435.3 |
| 2013/0100928 A1* | 4/2013 | Matsumori et al. | 370/331 |

FOREIGN PATENT DOCUMENTS

| | | |
|---|---|---|
| WO | 2004008793 A1 | 1/2004 |
| WO | 2007/010319 A1 | 1/2007 |

* cited by examiner

APPARATUS AND METHOD FOR NETWORK ACCESS DISCOVERY AND SELECTION

TECHNICAL FIELD

The present invention relates to a method and apparatus for use in a communications network.

BACKGROUND

Access technologies of various kinds, especially wireless, are becoming increasingly ubiquitous, e.g. in the shape of GSM/GPRS/EDGE, WCDMA/HSPA, CDMA2000, WLAN, WiMAX and soon LTE (EDGE is an abbreviation for "Enhanced Data Rates for GSM Evolution"; GPRS for "General Packet Radio Service"; GSM for "Global System for Mobile communication"; WCDMA for "Wideband Code Division Multiple Access"; HSPA for "High Speed Packet Access"; WLAN for "Wireless Local Area Network"; WiMAX for "Worldwide Interoperability for Microwave Access"; and LTE for "Long Term Evolution"; while CDMA2000 is a CDMA based 3G [3rd Generation] standard for cellular networks). The mobile terminals match this multitude of access technologies by including ever more access interfaces to allow greater freedom and flexibility in the selection of access to use for each communication session.

To leverage the benefits of this growing flexibility it becomes important to have mechanisms in place for efficient control of the access selection, to ensure that a mobile node always uses its available access interfaces and access networks as efficiently as possible for the currently ongoing communication sessions. Circumstances to take into account include e.g. the currently used applications, access network technologies and their properties, access network operators (and their relations to the user's home operator), current network conditions (e.g. load), location, subscription restrictions, time of day, etc. Similarly, it is desirable to support a mobile node in discovering available accesses without requiring the mobile node to continuously scan for all accesses and thus using battery resources.

In SAE/LTE, also known as EPS (Evolved Packet System), i.e. the future evolved 3GPP system, multi-access is a key element. Control of access selection (and access discovery) is recognized as an important aspect and has been assigned a dedicated work item.

The mechanisms considered are based on policies and/or rules. The functionality provided by a policy/rule is instructions or guidance of which access to select or how to discover accesses given the specific circumstance (device context).

The exact definitions of policies and rules and their precise relation are somewhat up in the air and the notion of this varies between different people. The standardization organizations 3GPP (3rd Generation Partnership Project) and IETF (Internet Engineering Task Force) are both working in the area. One view is that a policy expresses preferences or obligations on a higher level, whereas rules are lower level structures, which can be derived from policies, providing more detailed instructions for the access selection in a stricter format, e.g. pointing out a certain access network or access interface. In the background chapter the two volatile terms are mixed, partly because the text may apply to both terms, even in case their definition differs. However, in the actual description of the inventive solution only the term rule is consistently used.

Policies and/or rules may be processed in the network, e.g. in the Policy and Charging Rules Function (PCRF) or, in the context of access selection, more likely in the newly introduced functional entity Access Network Discovery and Selection Function (ANDSF), which is responsible for access selection between 3GPP accesses and non-3GPP accesses as well as between different non-3GPP accesses. The ANDSF is distributed between the mobile node (ueANDSF) and the network. In the network the ANDSF is located both in the home network (hANDSF) and in the visited network (vANDSF). The network based ANDSF will probably be located in an entity inside (i.e. as an integral part of) or "near" the PCRF. It is also possible that there will be ANDSF related functionality in non-3GPP access networks, e.g. for provision of access properties as input data to the access selection process. Such possible ANDSF related functionality in non-3GPP access networks is herein tentatively labeled n3aANDSF. The introduction of the ANDSF in the 3GPP SAE architecture, as well as the most basic related information flows, are illustrated in FIG. 1. PDN stands for Packet Data Network. ANDSR stands for Access Network Discovery and Selection Rule. ePDG stands for evolved Packet Data Gateway. HSS stands for Home Subscriber Server. VoIP stands for Voice over IP.

Processing of policies and rules in the ANDSF may take place either in the network or in the mobile node (User Equipment or UE) or in both. The most likely scenario is that at least the final processing will take place in the mobile node (UE) where the access selection decision is executed. The mobile node (UE) communicates with the hANDSF, e.g. to receive policy and rule information. The vANDSF and the hANDSF may also communicate such information between each other, but a possible alternative is that the mobile node (UE) communicates directly with the vANDSF. FIG. 2 illustrates a possible architecture for policy and rule control.

For access selection between accesses that interwork on radio access network (RAN) level (e.g. different 3GPP accesses, such as LTE, WCDMA/HSPA and GERAN, and certain non-3GPP accesses, e.g. CDMA2000), the access selection functionality is network based and is typically located within the RANs (e.g. E-UTRAN, GERAN, UTRAN, CDMA2000-RAN, where E-UTRAN is "Evolved Universal Terrestrial Radio Access Network", UTRAN is "Universal Terrestrial Radio Access Network" and GERAN is "GSM EDGE Radio Access Network") and possibly partly also in the Mobility Management Entity (MME) and/or (Serving GPRS Support Node) SGSN (see FIG. 3). Potentially, processing of access selection related policies and rules may take place also in this access selection functionality.

It should be noted that herein ANDSF stands for "Access Network Discovery and Selection Function", while aANDSF means ANDSF functionality in an access network, hANDSF means home ANDSF, n3aANDSF means ANDSF related functionality in non-3GPP access networks, ueANDSF means ANDSF functionality in the UE, and vANDSF means visited ANDSF. Similarly, while AN stands for Access Network, hAN is home Access Network, rAN is "roaming" Access Network, and vAN is visited Access Network. Similarly for hEPS (home EPS), vEPS (visited EPS), hPCRF (home PCRF), HPLMN (Home PLMN, where PLMN is Public Land Mobile Network), VPCRF (visited PCRF), and VPLMN (Visited PLMN).

FIG. 4 illustrates some access selection scenarios and examples of involved operators and cooperation constellations.

Access selection and access discovery are not restricted to mobile nodes/terminals. They are equally applicable for so called user networks. The term User Network (UN) refers to one or more inter-connected user devices that can access a network via one or more access technologies. Examples of a single-device user network are a cellular phone or a laptop, while an example of a multi-device user network is a Personal Area Network (PAN). In the context of 3GPP systems a device accessing the network is referred to as a UE (User Equipment). Although a UE is typically a single device, it may also consist of several devices constituting a UN.

There are several stakeholders in the process of access selection, e.g. the user, the home operator, operator of visited networks and providers of services. All stakeholders have an interest in the access selection and may want to influence its outcome. When several stakeholders provide rules to the ANDSF they may conflict with each other. Also there might be conflicts between rules from the same stakeholder when the applicability conditions for multiple rules are fulfilled, e.g. one rule that is applicable during a certain time (e.g. busy hour) and another rule that is applicable in a certain location or for a certain service. Existing solutions provide no method to resolve such conflicts.

It is desirable to provide a way to control selection and discovery of accesses for a mobile node in a multi-access system.

SUMMARY

According to a first aspect of the present invention there is provided a method for use in a communications network in which a plurality of accesses are available to a user entity for accessing a network resource, comprising: determining a set of active rules, each rule specifying respective preferences, at least relatively, for at least some of the plurality of accesses, with potential for conflict between the rules of the set concerning which access is most preferred; deriving from the set of active rules a new rule specifying respective preferences, at least relatively, for at least some of the plurality of accesses; and selecting an access for use by the user entity based on the new rule.

The method may comprise accessing the network resource using the selected access.

The method may comprise scanning for the selected access.

The method may comprise performing the deriving, selecting and scanning steps for a plurality of sets of active rules.

The preferences may be represented by respective preference values, and wherein the deriving step comprises combining the preference values from different rules according to a predetermined scheme to arrive at the new rule.

The active rules may be assigned respective priority values, and the deriving step may comprise combining the preference values based on the priority values.

The deriving step may comprise selecting as the new rule the active rule having the highest associated priority value (or the most preferred associated priority value).

The deriving step may comprise weighting the preference values of each rule based on its assigned priority value, and combining the weighted preference values.

The method may comprise determining the preference values from properties of the respective associated accesses.

The method may comprise deriving the new rule based only on those accesses of the plurality that are considered to be acceptable accesses for all of the active rules.

The method may comprise deriving the new rule based on modified respective priority values for the active rules, the priority value modification for each active rule compensating for the non-consideration of at least one of the accesses for that active rule.

The user entity may comprise one or more of: a user terminal; mobile node; mobile terminal; and user network.

According to a second aspect of the present invention there is provided an apparatus or arrangement for use in a communications network in which a plurality of accesses are available to a user entity for accessing a network resource, comprising: means for determining a set of active rules, each rule specifying respective preferences, at least relatively, for at least some of the plurality of accesses, with potential for conflict between the rules of the set concerning which access is most preferred; means for deriving from the set of active rules a new rule specifying respective preferences, at least relatively, for at least some of the plurality of accesses; and means for selecting an access for use by the user entity based on the new rule.

In a case where the preferences are represented by respective preference values, the deriving means may comprise means for combining the preference values from different rules according to a predetermined scheme to arrive at the new rule.

In a case where the active rules are assigned respective priority values, the deriving means may comprise means for combining the preference values based on the priority values.

The deriving means may comprise means for selecting as the new rule the active rule having the most preferred associated priority value, for example the highest associated priority value.

The deriving means may comprise means for weighting the preference values of each active rule based on its assigned priority value, and means for combining the weighted preference values.

According to a third aspect of the present invention there is provided a program or program product for controlling an apparatus to perform a method according to the first aspect of the present invention or which, when loaded into an apparatus, causes the apparatus to become an apparatus according to the second aspect of the present invention. The program may be carried on a carrier medium. The carrier medium may be a storage medium. The carrier medium may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

An embodiment of the present invention provides mechanisms for resolution of conflicting access selection or access discovery rules in multi-access systems. The conflict resolution works for conflicting rules provided by the different sources (e.g. operators) but also for conflicting rules provided by the same source.

This kind of solution is required to fulfil the requirements of a 3GPP system architecture evolution as stated in 3GPP TS 23.402 v8.0.0, "3rd Generation Partnership Project; Technical Specification Group Services and System Aspects; Architecture enhancements for non-3GPP accesses (Release 8)", December 2007.

An embodiment of the present invention provides one or more of the following advantages:

When e.g. two or more services which trigger different rules are running, it is possible to find an interface that might be good for all or multiple services and not only for the one that triggered the rule with the highest priority.

In a situation where two (or more) applications with different requirements are running it can be avoided that an access is selected that has properties in between the two (or more) applications' requirements, but said access being not usable for any of the applications.

An embodiment of the present invention can use a weighted approach which allows different applicable rules to influence the decision to different degrees. Different degrees of preference (i.e. "how much" a certain access is preferred by a rule) are captured and reflected in the resulting access selection, thus allowing a nuanced evaluation of the available accesses during the access selection process.

Appropriate embodiments of the present invention can take into account that it sometimes is not appropriate to assume that the full resources of candidate access(es) are available when processing rules. Thus, an embodiment of the present invention can for instance take into account that simultaneously running applications may contend for the same access resources and allow this to appropriately impact the access selection process when beneficial. In essence, an embodiment of the present invention can ensure that the resources that are actually available to each contending application are appropriately reflected in the access selection process, which under some circumstances will cause another access (or other accesses) to be selected than would have been the case if each application had been considered separately.

An embodiment of the present invention is applicable not only for non-simultaneous multi-access, but also for simultaneous multi-access, in which case combinations of accesses and application flows are evaluated in view of the applicable rules.

DETAILED DESCRIPTION

Figure 1:
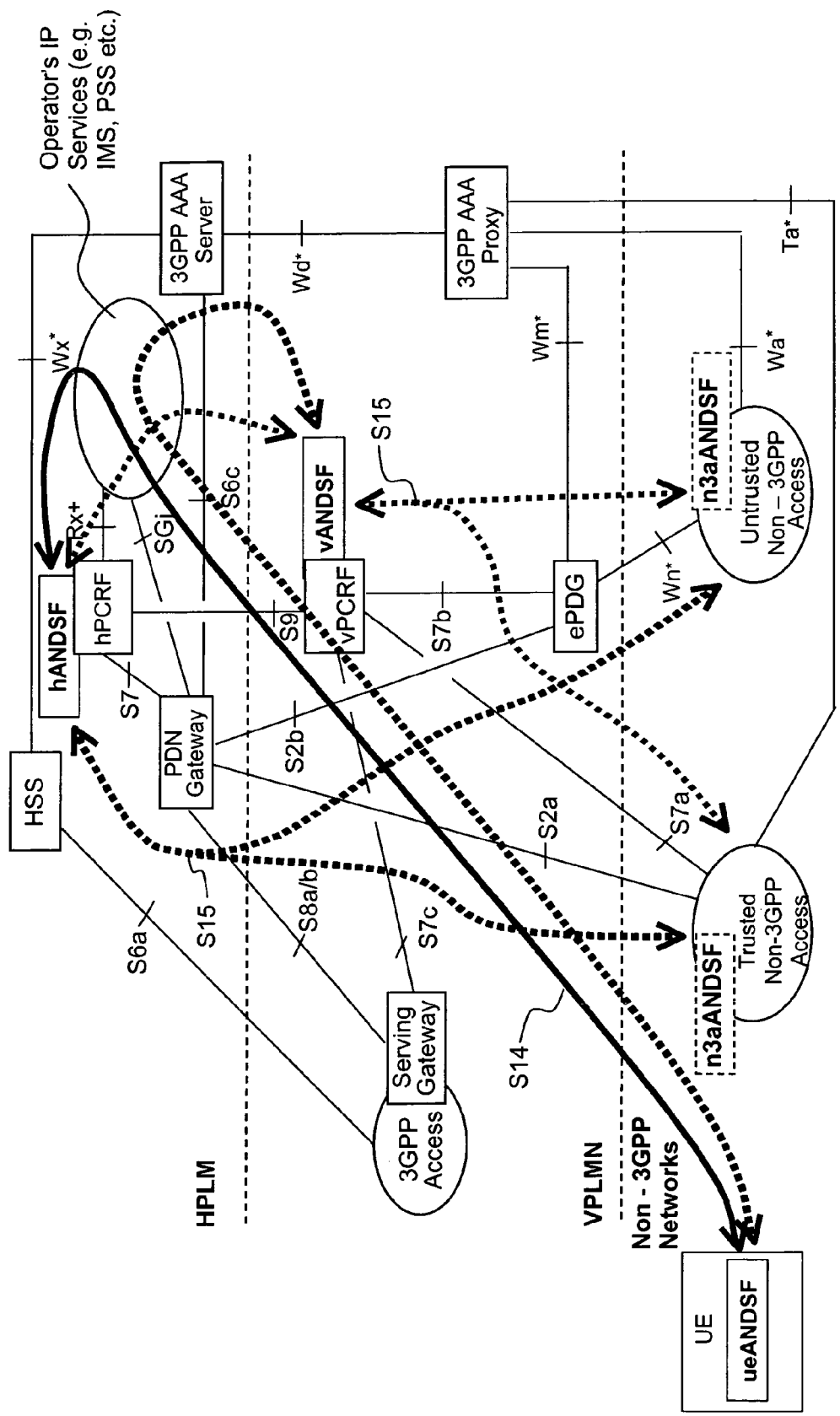
FIG. 1 illustrates an ANDSF in a SAE architecture and related information flows.
Figure 2:
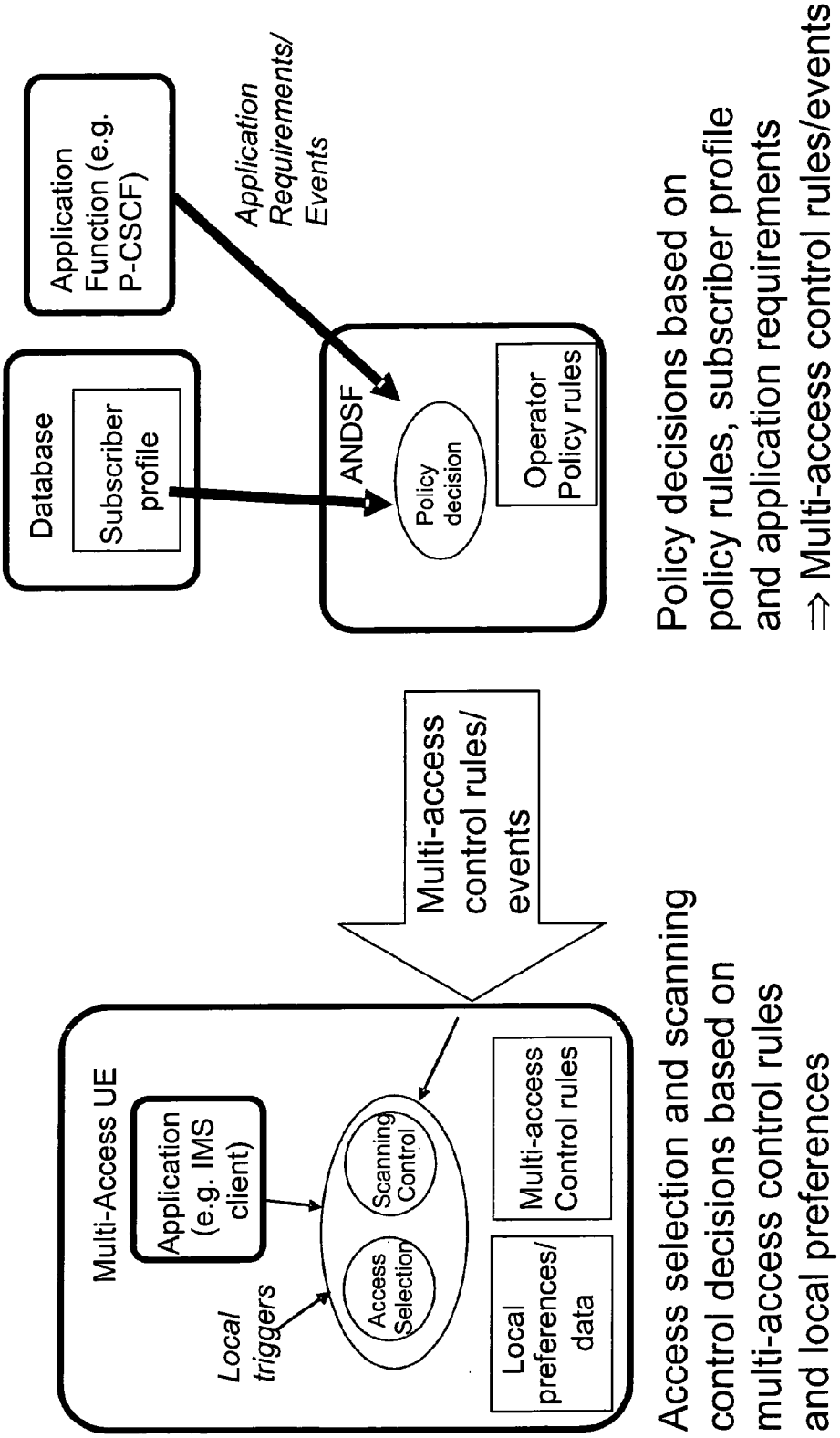
FIG. 2 illustrates a possible architecture for policy and rule control.

It is a key requirement for a multi-access system to provide mechanisms for selection of access (or accesses) that should be used (or not used, enabled or disabled) by a mobile node or a user network. Such access selection should be possible to perform while maintaining connectivity or scanning for connectivity. Although the primary focus is on selection of access(es) to be used for traffic flows, selection of accesses to scan for (i.e. attempt to discover the presence of) is also an applicable area.

Thus, access selection mechanisms for the following areas should be supported:
  access selection (for traffic flows)
  access discovery In both cases rules are the basis for the selection mechanisms. To provide good performance of a selection machinery based on rules mechanisms for resolving conflicts between rules or merger of multiple applicable rules are important, especially when multiple stakeholders (sources of rules (or policies from which rules are derived)) are involved.

The properties of rules governing access selection and access discovery are important in relation to an embodiment of the present invention. As mentioned above, rules provide instructions or guidance of which access to select given the specific circumstance (device context).

More formally, each access selection rule provides at least:
  A preference order of which access (or accesses) among the available ones that shall be used by a mobile node.

Likewise, each access discovery rule provides at least:
  Information about the availability and parameters of access networks, which allows the mobile node to enable/disable radio modems (e.g. to save battery consumption), and/or to configure access discovery and scanning procedures (e.g. to save battery consumption and accelerate connectivity setup), and/or to configure connectivity setup procedures (e.g. to save battery consumption and accelerate connectivity setup).

Additional properties of rules include:
  The rules are provided e.g. by the end user, automated software running on one or more nodes of a user network, by functions located in one or more access networks, by functions located in one or more core networks, by functions located in other network nodes, e.g. in a service network, by application providers, by application designers. Each of these rule providers can provide multiple rules. There can be conflicts between different rules.
  The rules can be restricted to a set of conditions; if the conditions of a rule are fulfilled the rule will be used in the access selection or access discovery process. The rule is then (using any of equivalent terms) referred to as an active rule or an applicable rule (The terms active rule and applicable rule are both used herein. They are equivalent and should be regarded as interchangeable). The condition(s) which must be fulfilled for a rule to be applied can be called the rule's applicability condition(s). The conditions relate to the context of the mobile node or user network. For the mobile node or user network the context is determined and compared with the one or more context conditions to determine if the rule is active or inactive. For example, a rule can be conditioned to:
    Time: it is only applicable during specific periods of time e.g. once or repeated, during busy hour, during week-days, during network reconfiguration periods etc,
    Location: it is applicable only if the mobile node or user network is in a certain location region (The location region can be expressed in any suitable form, e.g. a polygon defined by the coordinates of the points, a center of a circle and a radius, the coverage area of radio cells (identifiable via the reception of cell beacons—or fingerprints of the signals by multiple cells))

e.g. when the user is located within the area of certain hotspots, indoor or outdoor, within the coverage area of corporate/private/regional/public networks etc, Velocity: it is applicable only if the mobile node or user network is moving faster and/or slower than certain thresholds (Velocity can be expressed in any suitable form like, e.g. by time derivatives of the position, or handover rates between radio cells), Connectivity context: it is applicable only if certain connectivity parameters are fulfilled
- e.g. connectivity is provided by a certain networks or by certain access points/base stations (Identification occurs via some network, access point, base station, node identifier(s)),
- connectivity is provided to certain networks, e.g. the public Internet, private/corporate networks, certain operator networks, IMS (IP Multimedia Subsystem) networks,
- the connectivity provides certain security mechanisms (encryption, integrity protection, authentication, authorization and accounting),
- the connectivity is based on certain connectivity mechanisms and protocols, e.g. network/terminal based mobility, IPv4 (Internet Protocol version 4) or IPv6 (Internet Protocol version 6) usage, Mobile IP (MIP) or Proxy Mobile IP usage, availability of IEEE 802.21 or Ambient Networks functions and mechanisms, the availability of seamless mobility mechanisms or location privacy
- Connectivity can be provided with a specific performance characteristics (achievable data rate, delay, reliability)

Application (or service or communication type) (The term "application" is for simplicity henceforth used as meaning application or service or communication type) context: the applications (and their communication requirements) that are currently active, are typically used, are started or terminated.

Costs: it is applicable only if the access is provided in a certain cost range, available pre-paid or flat rate tariffs can be used, certain payment methods are supported Service context: it is applicable only if certain services can be reached e.g. emergency services, positioning services Resources: it is applicable only if a certain battery level is available, the mobile node or user network is connected to power supply, memory and processing resources are available, etc.

Rules can contain wildcards. E.g. a rule can apply to all WLAN networks, or to only certain WLAN networks, or to only certain access points of certain WLAN networks. Certain rules (e.g. a default rule) can be always active.

An access selection rule could for example be expressed as follows (although in a real implementation the rule would be differently coded, e.g. in XML):

{If dayOfWeek ≠ Saturday/Sunday AND timeOfDay > 08:00 AND timeOfDay < 18:00 THEN select access according to the following priority order:
LTE
HSPA
WLAN
GSM/EDGE
<any access>}

Another rule example could be:

{IF application = VoIP THEN select accesses according to the following priority order:
WCDMA
HSPA
LTE
<no access>}

But as suggested below, a somewhat different approach to rule writing is also conceivable, where the rule is a generic evaluation of an access based on the properties of the access and where the rule produces a value that reflects the relative preference of the access. In the following example "R" represents the value that reflects the relative preference of the access being evaluated:

{IF bitRateKbps<10 kbps THEN $R=0$ ELSE
$R$=bitRateKbps/10}

Figure 5:
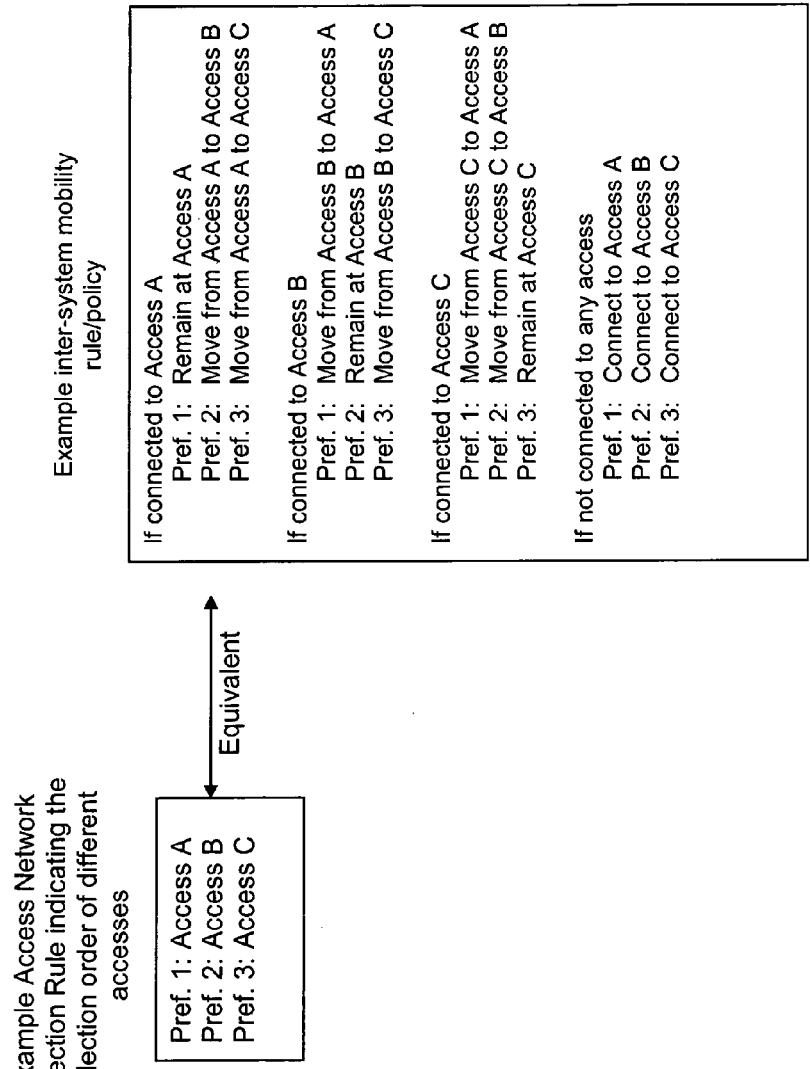
FIG. 5 illustrates access selection rule examples, showing that access selection rules can be seen as equivalent to what in 3GPP is referred to as inter-system mobility rules.

More examples of rules are depicted in FIG. 5. The access selection alternatives in FIG. 5 are listed in order of preference, i.e. "pref. 1" indicates "most preferred". This figure also explains that the kind of rules referred to in this document can easily be transferred by anyone skilled in the art into what with 3GPP terminology is referred to as inter-system mobility rules. Hence such inter-system mobility rules can be seen as a subset of the access selection/discovery rules dealt with in this document.

As mentioned above, the scope of the selection machinery and of this document encompasses both access selection and access discovery. However, since the primary target of the invention is access selection (for traffic flows), the major part of the inventive mechanisms are described in the context of access selection and using the terminology of access selection. The terms "mobile node", "mobile terminal" and "user network" are henceforth used interchangeably, all referring to one or more inter-connected user devices that can access a network via one or more access technologies.

Before going in to the inventive mechanisms for resolution of conflicting rules, or merger of multiple applicable rules, for access selection it is important to have a reasonable definition of what is meant by an "access".

An access can be defined by a combination of one or more of the following discriminators:
(a) access type (and/or property parameters)
(b) access point ID (Identity)
(c) access network ID
(d) core network ID (a) could be in the simplest case only the "access type" 802.11, WiMAX, E-UTRAN, UTRAN, GERAN, . . . ; but it could also distinguish the following three as separate accesses depending on "access type parameters": {(LTE, 2 GHz carrier frequency, 40 MHz carrier bandwidth), (LTE, 3.8 GHz carrier frequency, 100 MHz carrier bandwidth), (LTE, 900 MHz carrier frequency, 5 MHz carrier bandwidth)}

(b) could be required, if a certain rule is only applicable for a certain number of access points, NodeBs, etc., e.g. if we have a rule for a corporate network or a home zone.

For (c) and (d): an access network can have its own id; it can provide connectivity to any kind of other network; or it can provide access to a limited number of core networks. A rule could be applied that is only applicable for a certain access network; a rule could also be applied for access networks that provide connectivity to a certain core network.

According to this reasoning an access is, in the context of an embodiment of this invention, defined according to at least one of (a)-(d).

By comparing the present context with context conditions, rules are activated or inactivated (depending on whether the respective rule's applicability conditions are fulfilled). After context comparison, multiple rules can be simultaneously active and can have conflicting rule objectives.

The following generic solution enables derivation of a valid rule out of a number of conflicting active rules. The valid rule is then used for access discovery and/or selection instead of the conflicting active rules. It could be that the active rules are all mutually conflicting with each other, but it could also be the case that some active rules are in agreement with each other but in conflict with one or more other, as long as there is at least one conflict among the set of active rules; all rules are taken into account in the conflict resolution process.

A valid rule is derived from a group of conflicting active rules in the following procedure.

Assume a number of conflicting rules $R_i$. Each rule $R_i$ is represented by an "access preference value" $g_i(x)$ and a "rule priority value" $w_i$, where the parameter x contains all context parameters of the system, e.g. time, the UN location, velocity, connectivity parameters (e.g. data rate, Received Signal Strength Indicator or RSSI, Reference Signal Received Power or RSRP, Signal to Interference plus Noise Ratio or SINR, etc). In this description, these "access preference values" are variously known as or represented by "preferences", "orders" or "rating values", while the "rule priority values" are variously known as or represented by "weights", "priorities" or "precedences". In this respect, "priority" and "precedence" can be considered to be opposites, with low precedence and high priority both being considered as being urgent or important.

The conflicting rules $R_i$ may take the following form:

$R_i$: under the condition (condition set of $R_i$) use accesses defined by the access set A according to the preference values of the vector $g_i(x)$, whereby this rule $R_i$ has a weight $w_i$. The preference value in $g_i$ with index m expresses the preference of the access with index m of the access set A. A preference value can be expressed e.g. as an integer value, where a larger value corresponds to a higher preference. This might be the case when every access for access selection has a static preference assigned. On the other hand, a preference value can also be a real value, which expresses the suitability or utility of an access. In this case, the preference value could be strongly influenced by dynamic parameters like the current data rate.

We now assume that for three conflicting rules $R_1$, $R_2$, $R_3$ their corresponding context conditions (i.e. their condition sets) are met and the rules are thus active rules; all other rules do not meet the context conditions and are thus inactive.

The novelty of this invention is to derive a new valid rule $R_v$ out of the active rules $\{R_1, R_2, R_3\}$ and their corresponding weight $\{w_1, w_2, w_3\}$:

$$R_v = f(R_1, w_1, R_2, W_2, R_3, w_3)$$

This can be expressed as $$R_v : g_v(x) = h(g_1(x), w_1, g_2(x), w_2, g_3(x), w_3)$$

where $g_1(x)$, $g_2(x)$ and $g_3(x)$ represent the conflicting rules, for example:

$$R_v : g_v(x) = a_1(x, w_i) \times g_1(x) + a_2(x, w_2) \times g_2(x) + a_3(x, w_3) \times g_3(x)$$

where $a_1(x, w_i)$, $a_2(x, w_2)$ and $a_3(x, w_3)$ are rule merging coefficients.

Figure 6:
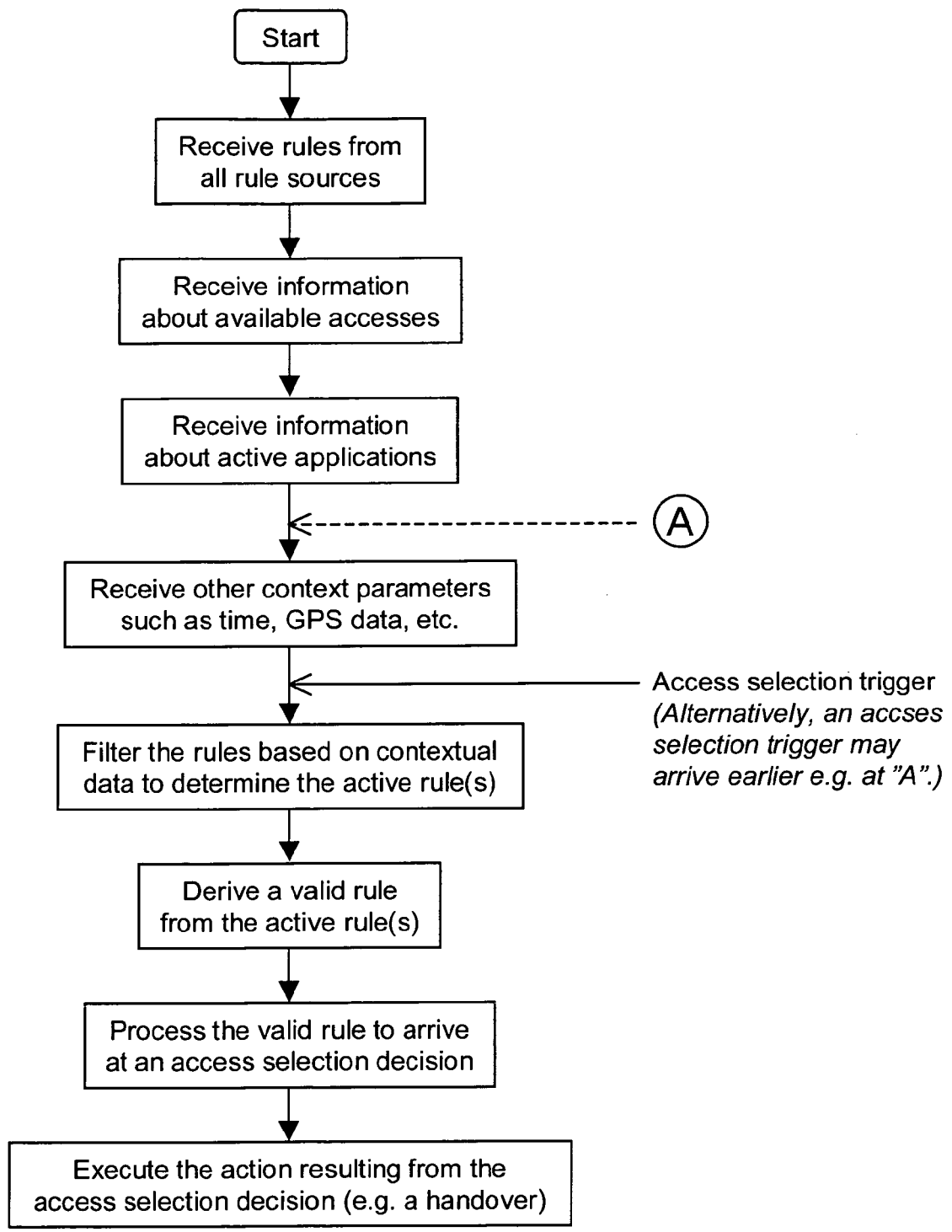
FIG. 6 is a schematic flowchart illustrating the basic general solution.
Figure 7:
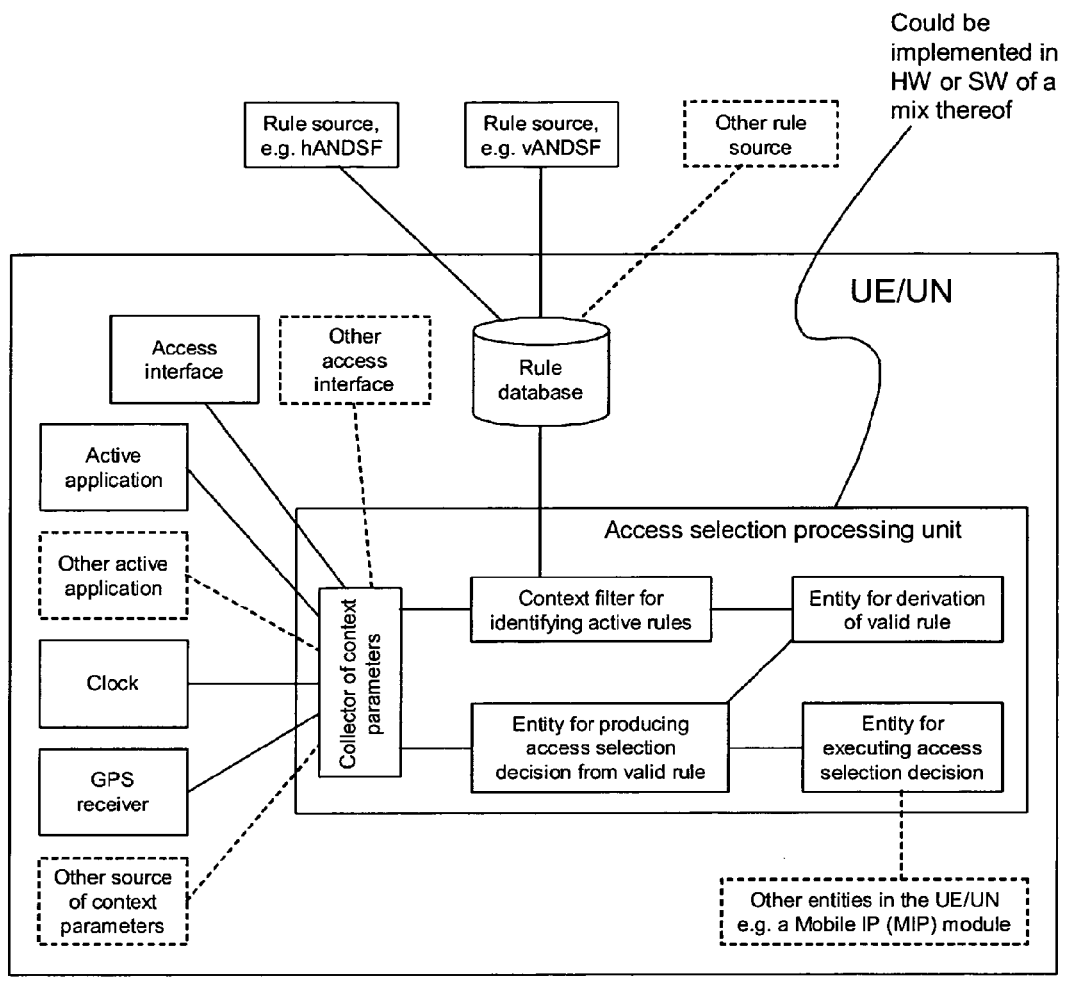
FIG. 7 is a schematic representation of a possible implementation of the basic general solution.

There are different options for how a valid rule is derived. A simple flow chart illustrating the generic solution is depicted in FIG. 6. FIG. 7 provides an example of block chart of a possible implementation of the generic solution according to the invention.

When scanning for networks there is a need to choose which access that should be scanned. In the case of single radio devices where several access technologies share the same transmitter there can be conflicts between different network discovery rules. These conflicts should be solved in a manner so that the network discovery functionality should scan for networks in the order they are needed by the accesses pointed out by the merged rule $R_v$.

A rule for access discovery has, for example, the form:

$R_i$: under the condition (condition set of $R_i$) search for accesses defined by the access set A according to the preference values of the vector $g_i(x)$, whereby this rule $R_i$ has a weight $w_i$.

Note that for access discovery there may be multiple independent groups of active rules without conflicts. Each such group typically concerns discovery of a certain Radio Access Technology (RAT) or RATs using the same access discovery mechanism. For each group of conflicting active rules a valid rule is derived. Hence there can be multiple valid rules.

For example, there can be one set of conflicting rules regarding the discovery of WLAN networks, and another set of conflicting rules regarding the discovery of WiMAX networks. In case of a user network which has a single-radio implementation of WiMAX-WLAN (e.g. based on software-defined/reconfigurable radio) the UN can only connect to or scan WLAN or WiMAX but not both at the same time. In this case the WLAN discovery rules and the WiMAX discovery rules are conflicting. In case of a dual-radio implementation with separate radio modules for WiMAX and WLAN, the UN can connect to or scan both WLAN and WiMAX simultaneously. In this case two independent groups of WLAN and WiMAX discovery rules can be determined and corresponding valid rules can be derived. One valid rule determines the behavior of access discovery for WiMAX (via the WiMAX radio module), the other determines the behavior of access discovery for WLAN (via the WLAN radio module). In addition there can be a further group of conflicting rules concerning access selection preferences, which are independent from the WiMAX/WLAN discovery rules. As a result a further valid rule for access selection preferences is determined.

In a networking scenario, where a user network can connect to a networking infrastructure via a multitude of accesses, access network discovery and selection rules are used to control and/or support the user network. These rules can be provided by one or more network entities, as well as, the end user or end user equipment. The rules provide guidelines on how to select an access under certain conditions and can also provide support information that render the discovery of available and suitable accesses and access networks more effective and help to save battery consumption of the user network.

The invention gives principles for a generic solution for deriving a valid rule out of a set of applicable/active rules.

In addition the invention comprises decision set reduction principles, with and without rule/application pruning, as well as combination of decision space reduction followed by access selection among accesses of the reduced set of selectable accesses Furthermore, the invention comprises overall principles for realization of the generic solution, i.e. principles for a priority based access selection scheme and principles for a weight-based linear combination access selection scheme.

Finally the invention comprises specific aspects and detailed mechanisms of the example embodiments.

Modifications and other embodiments of the disclosed invention(s) will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention comprises different schemes for how to derive a valid rule in accordance with the above described general solution. A method, which however can be used as an optional part of all these schemes is to start by reducing the decision space, i.e. the set of selectable accesses, according to some relevant criteria before the applying the respective selection scheme.

A method of reducing the decision space on a generic level as well as a specific method will be described below based on this concept. Following that will be a description of schemes for selecting an access from a set of selectable accesses. These schemes can be used with or without prior reduction of the decision space.

The objective of decision space reduction is to prioritise decision options which fulfil a large number of rules. This can be achieved by identifying such options in the decision space and reducing the decision options of the different rules to a reduced number of feasible options. In essence, this reduction process means that the set of selectable accesses is identified that fulfils all rules. With set theory terminology this means that the set of selectable accesses represents the intersection of each rule's respective set of acceptable accesses.

An example is when there are two applicable rules, one rule $R_1$ which describes the access preferences for an active multimedia telephony service, and one rule $R_2$ for another service. The available access options are $\{A_1, A_2, A_3\}$ and it is assumed that $R_1$ has a higher priority (i.e. a higher weight w). If the access preferences of $R_1$ and $R_2$ are:

$$g_1(x)=[10,7,6], w_1=2$$

$$g_2(x)=[0,5,4], w_2=1$$

the access selected by the access selection scheme may well turn out to be access $A_1$ (this is for instance the result of both the priority-based scheme and the weight-based linear combination scheme which are described in later sections). As a result the multimedia telephony service will use access $A_1$ while the other service may be dropped due to an unsuited access $A_1$.

In this case, decision space reduction can be used to allow that multiple rules can be fulfilled at the same time. In this example, the decision space $\{A_1, A_2, A_3\}$ is investigated to find a subset that fulfils a large number of rules. In this case the subset $\{A_2, A_3\}$ represents the intersection of the two rules' sets of acceptable accesses and thus enables that all applicable rules are fulfilled simultaneously. By reducing the decision space $$\{A_1, A_2, A_3\} \Rightarrow \{A_2, A_3\}$$

the rules are modified $$R_i \Rightarrow R'_i$$

$$g_i(x) \Rightarrow g'_i(x)$$

to become $$g_1(x)=[10,7,6] \rightarrow g'_1(x)=[7,6]$$

$$g_2(x)=[0,5,4] \rightarrow g'_2(x)=[7,6]$$

where the number arrays represent preferences produced by the rules $g_i(x)$ for the respective accesses $A_1, A_2, A_3$ and by the modified rules $g'_i(x)$ for the respective accesses $A_2, A_3$.

The weights of the rules may remain constant during the decision space reduction. Alternatively, the weights of the rules can be adapted during the decision space reduction so that the weight increases for rules where valuable preference options have been removed. For example:

$$w'_1 = w_1 \cdot \frac{10+7+6}{7+6} = 3.54$$

$$w'_2 = w_2 \cdot \frac{0+5+4}{5+4} = 1$$

On this modified rule set the standard rule merging is applied (e.g. priority-based or weight-based linear combination as described later). In this example access $A_2$ is selected.

Decision space reduction may also be performed on two levels. This is illustrated below with an example with two decision space reduction levels.

Two decision space reduction levels can be motivated by stating that the goal of the access selection process is to achieve the following (without violating any goals):

1. Satisfy all active rules.
2. If 1 cannot be fulfilled, select one or more access(es) that is(are) at least acceptable (albeit not necessarily satisfactory) to all rules.
3. If neither 1) nor 2) can be fulfilled, select one or more access(es) that is(are) satisfactory or at least acceptable to the most important, or as many as possible, of the rules. (This may result in that some applications are dropped.)

To support the two-level decision space reduction three subsets of the available accesses are identified by each rule, each subset representing a category:

Category 1: Satisfactory. For rule $R_i$ the set of accesses in this category is denoted $S_{Satisfactory\_Ri}$.

Category 2: Acceptable (but not satisfactory). For rule $R_i$ the set of accesses in this category is denoted $S_{Acceptable\_Ri}$.

Category 3: Not acceptable. For rule $R_i$ the set of accesses in this category is denoted $S_{Not-acceptable\_Ri}$.

The categorization process either uses:

Threshold values applied to the access preferences, i.e. one threshold for category 1 and one for category 2. If the preference value is below the category 2 threshold, the access is placed in category 3, or "Subrules", such that each rule contains three subrules: one subrule defining category 1 accesses, one subrule defining category 2 accesses, and one subrule producing preference values (or similar, such as priorities or ordered lists).

After access categorization by all rules the decision space reduction process creates a set $S_{Common-satisfactory}$ including the accesses which are categorized as category 1 by all rules, i.e.

$$S_{Common-satisfactory} = S_{Satisfactory\_R1} \cap S_{Satisfactory\_R2} \cap S_{Satisfactory\_R3} \cap \ldots$$

That is, the set $S_{Common-satisfactory}$ represents the intersection of all rules' respective category 1 set.

$S_{Common-satisfactory}$ contains the selectable accesses at the first decision reduction level. Unless this set is empty, an appropriate access selection scheme (these are described in detail later) is applied among these selectable accesses.

If $S_{common-satisfactory}$ is empty, initiate the second level decision space reduction. The second level decision space reduction will normally produce a larger set of selectable accesses than the first level, which increases that chances that the set of selectable accesses is non-empty.

At the second level the decision reduction process creates a set $S_{Common-acceptable}$ which includes the accesses which are categorized as either satisfactory or acceptable by all rules, i.e.

$$S_{Common-acceptable} = (S_{Satisfactory\_R1} \cup S_{Acceptable\_R1}) \cap$$
$$(S_{Satisfactory\_R2} \cup S_{Acceptable\_R2}) \cap$$
$$(S_{Satisfactory\_R3} \cup S_{Acceptable\_R3}) \cap \ldots$$

That is, first the union of each rule's category 1 and category 2 sets is created and then $S_{common-acceptable}$ represents the intersection of these unions.

$S_{Common-acceptable}$ contains the selectable accesses at the second decision reduction level. Unless this set is empty, an appropriate access selection scheme is applied among these selectable accesses. At this stage it is possible to introduce an additional, optional access selection criterion: a selected access should be included in the category 1 set of as many rules as possible. If, for instance, a single access is to be selected, the selection process identifies the access(es) that is(are) included in the category 1 set of the largest number of rules. If this yields more than one equally ranked access, an appropriate access selection scheme is applied to select one of them.

The approach using two levels can further be extended to support any number of levels. The algorithm is applied the same way as with the first and second level, creating unions between the sets of the different levels for each rule. This can be expressed in the following way.

$$S_n = (S_{1\_R1} \cup \ldots \cup S_{n\_R1}) \cap \ldots \cap (S_{1\_Rm} \cup \ldots \cup S_{n\_Rm})$$

Where n is the currently evaluated level and m is the number of rules.

When reducing the decision space it is possible that the resulting set of selectable accesses is empty (in the two-level example this means that $S_{Common-acceptable}$ is empty). When this happens one can either conclude that since no acceptable access is available the mobile node should stay unconnected (and possibly ask the user for instructions) or prune the set of active rules (from conflicting rules) to enable a successful access selection. Several different approaches exist to how this can be done:

Pruning alternative 1:
Remove rule with the lowest weight. Redo the decision space reduction and if the set of selectable accesses is still empty, continue pruning by removing the rule with the second lowest weight.

Pruning alternative 2:
Find all combinations of rules that do not result in an empty set of selectable accesses after decision space reduction and pick the combination which provides the greatest sum of weights among the rules.

Pruning alternative 3:
Use pruning alternative 1 but remove rules randomly instead of based on weights.

Pruning alternative 4:
Use pruning alternative 2 with all weights assumed equal.

Pruning alternative 5:
Disregard weights and ask the user of the device. Keep asking until the user suggests a rule combination that yields a non empty access set.

Pruning alternative 6 (Best mode):
Calculate the intersection between the set of acceptable accesses (or the set of acceptable or satisfactory accesses) of the rule with the lowest priority and the corresponding sets of all other rules. If the intersection set is empty, remove the rule with the lowest priority. Redo for all rules in ascending order.

The pruning may also be used only for a subset of all rules (e.g. all rules related to service/application preferences (e.g. application specific rules)).

An alternative to pruning rules when faced with an empty set of selectable accesses is to prune the set of active applications (i.e. the set of applications allowed access to network connectivity). This is especially suitable when the rules and the access selection process are designed to take into account the presence of simultaneously active applications, each demanding a share of the available access resources. In such a scenario, removing applications, may free enough resources for the remaining applications to enable a successful access selection.

When application pruning is used, each application is preferably associated with a priority or weight (default priorities/weights can be used when needed). Then all of the above described rule pruning alternatives can be used also for application pruning (but with "rule" substituted by "application" in the descriptions).

There will now be described different schemes for realizing the previously-described general solution for access selection. First some important principles for how schemes can be designed are described on a general level, followed by detailed descriptions of specific embodiments.

In a priority-based scheme every rule has a clear priority value as weight $w_i$, which is typically an integer value. The objective of this scheme is to fulfil the most significant rule. If every priority occurs only once, a valid rule can be easily found by selecting the rule which has the highest priority.

Determine the rule z with highest priority, $$z = \operatorname*{argmax}_{i}(w_i)$$

Set the rule merging coefficients $a_i$ (see the description of the general solution) as $$a_i = \begin{cases} 0, & \text{for } i \neq z, \ // \text{this rule is disabled} \\ 1, & \text{for } i = z, \ // \text{this rule is enabled} \end{cases}$$

which results in the rule z becoming the valid rule $$R_v: g_v(x) = g_z(x)$$

If we assume that $g_z(x)$ is a vector of access preferences, e.g.

$$g_z(x) = [1,5,6,4,2]$$

for the corresponding accesses $\{A_1, A_2, A_3, A_4, A_5\}$, the access with the highest preference (in this example integer priorities, but it could also be a real valued preference) is selected.

For the UN the connectivity state can be determined and characterised by a certain connectivity vector C. It describes the connection capabilities of the accesses. For example, the vector element $c_m$ for access m is set to $c_m=1$ //sufficient connection capabilities if sufficient connection capabilities can be achieved with access m (e.g. a minimum signal strength, data rate, delay is achieved and the connectivity works (successful AAA [Authentication, Authorization and Accounting], security mechanisms, . . . )). If the connection capabilities are insufficient $c_m=0$ //insufficient connection capabilities.

A connectivity vector c=[1 1 0 0 1], thus means that accesses $A_1, A_2, A_5$ provide good connectivity and $A_3, A_4$ do not.

The access is then selected according to the access preference and the access connection capabilities:

$g_z(x) \otimes c^T=[1,5,6,4,2] \otimes [1\ 1\ 0\ 0\ 1]^T=[1,5,0,0,2]$

The access with the highest preference 5 is in this case $A_2$.

In a weight-based combination scheme every rule has weight $w_i$, which is typically real-valued. The objective of this scheme is to fulfil all rules to a certain extent. A valid rule is composed out of the active rules according to their weight. In the easiest case the composition factor $a_i(x, w_i)$ (which corresponds to the previously described rule merging coefficient) is equal to the weight $a_i(x,w_i)=w_i$ A linear combination scheme of the active rules does then result in $$R_V: g_V(x) = a_1(x, w_1) \times g_1(x) + a_2(x, w_2) \times g_2(x) + a_3(x, w_3) \times g_3(x)$$
$$= w_1 \times g_1(x) + w_2 \times g_2(x) + w_3 \times g_3(x)$$

Example

We assume two active rules with the preference values according to suitability (e.g. based on signal quality, throughput, priority, etc.)

$g_1(x)=[0,0.5,0.7,1,0.7,0.4]$ $g_2(x)=[0.2,0.7,0,0,0.5,0.3]$ which correspond to the accesses $\{A_1, A_2, A_3, A_4, A_5\}$.

For a set of weights, $w_1=1$ and $w_2=2$, the resulting valid rule is $$R_V: g_V(x) = w_1 \times g_1(x) + w_2 \times g_2(x)$$
$$= [0.4, 1.9, 0.7, 1, 1.7, 1]$$

In this case access $A_2$ has the highest preference and is selected.

Now will be described example embodiment 1 (a precedence based scheme). In this embodiment an access selection rule is denoted Multi-Access Control Rule (MACR).

Figure 8:
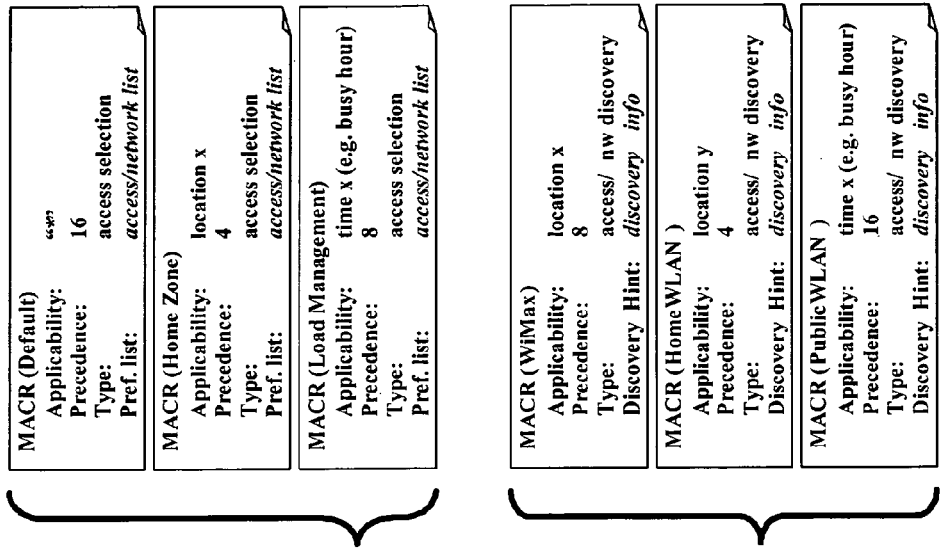
FIG. 8 illustrates an example of multi-access control rules (MACR)

Different operators and the user can provide multi-access rules for a user network. Further, even a single operator can provided a multitude of rules for the user network (e.g. a rule that is applicable during busy hour, another rule that is only applicable for a certain user network location, and a further rule that is always applicable). As a result, several of these rules can be conflicting, leading to undetermined and/or unintended behaviour of the user network. FIG. 8 illustrates an example of multi-access control rules (MACR).

Figure 9:
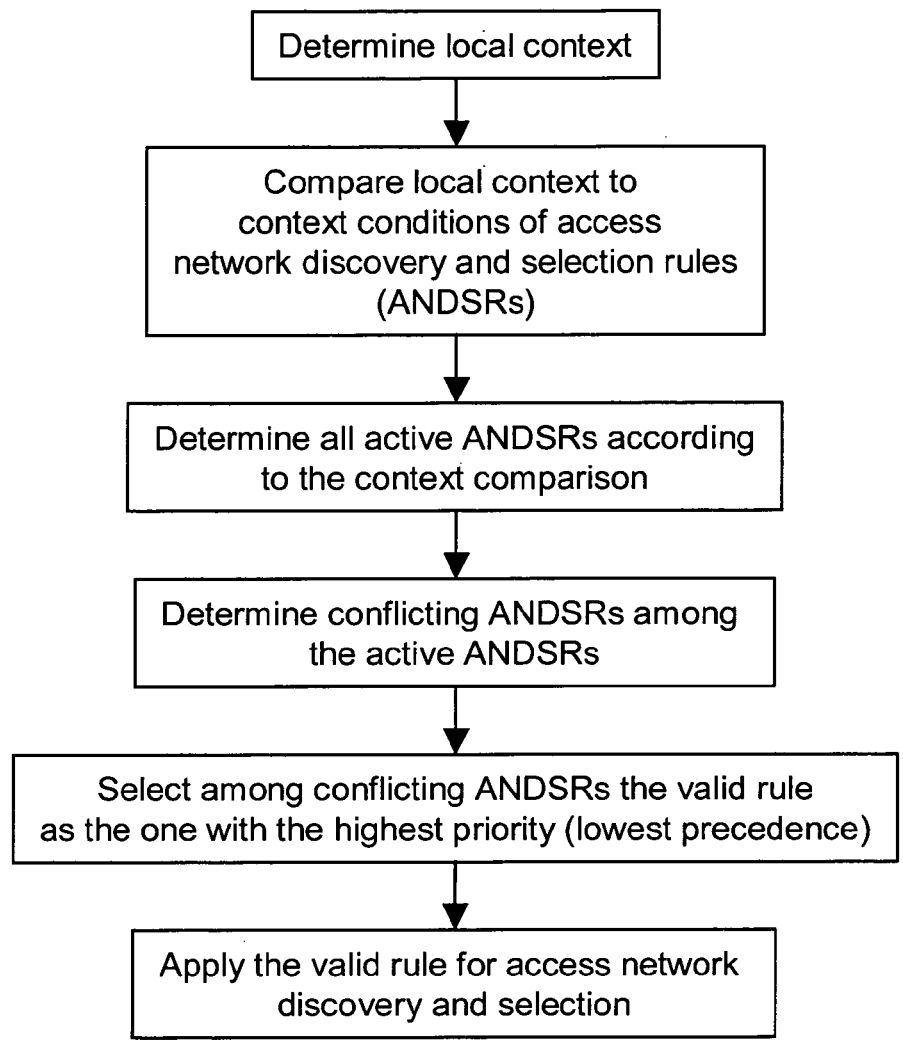
FIG. 9 is schematic flow chart illustrating embodiment 1.

This embodiment proposes a conflict resolution mechanism, which is based on precedence values that clarify the priorities of rules with respect to each other. A basic flow chart illustrating the basic principles of the embodiment is depicted in FIG. 9.

There are different options for the embodiment.

A single precedence value determines the priorities between rules. A rule with lower precedence invalidates all other conflicting rules with higher precedence values. For different actors a different range of precedence value is reserved. For example, the user has the precedence values 0-99, the home operator has the precedence values 100-199, a first visited operator 200-299, . . . , and different access providers have precedence values 1000-1099, 1100-1199 etc.

In this scenario each actor uses the own precedence range in order to compose preferences among the own compiled rules. The non-overlapping precedence ranges between actors automatically provides conflict resolution between actors.

Another option is that every actor uses the same precedence range of e.g. 0-99 for the own composed rules.

In addition a further actor priority determines in case that rules between different actors conflict about whose rule overrules conflicting rules.

A typical configuration would be that either the user or the home operator would have the highest actor priority and visited operators and access providers have lower actor priority.

As a special case, it may be the user which provides actor priority values to the different actors.

Alternatively, and in order to take different cooperation schemes into account, every actor gets a range of actor priority values. An operator can share parts of his actor priority range with cooperation partners. E.g. the home operator has the range 90-99 of actor priority values. In cooperation (e.g. roaming) agreements with other operators, he can pass some of his actor priority values on (e.g. provide 90-92 to roaming partners).

One typical scenario is that the user has the highest actor priority, followed by the home operator, and then further actors. However, there may be certain cases where a home operator does not allow certain user actions. For example, depending on the subscription, a user may only be permitted to use 3GPP access technologies and not non-3GPP access technologies for operator provided services. If the user would overrule the rules, he could select non-3GPP access; however session set-ups in non-3GPP or handovers to non-3GPP would be rejected by the operator. This case could lead to a deadlock: the user rule would always select a non-3GPP access and connect to it. However, the later handover event would always fail. However, since the applicability conditions of the user rule are still fulfilled, the user network would again try to connect to non-3GPP.

To overcome this situation, there is a further option, that a (home) operator has a user priority allowed indication in every rule. If this flag is not set, an operator rule cannot be overruled by a user rule.

The invention should further consider the additional cases of other rules, like:
  Rules about if a circuit-switched or packet-switched domain shall be used for services that can be supported in both domains.
  Different rules and different rule conflict resolution schemes for different types of (connectivity) services:

For local breakout, or local services the local operator has highest priority.

For home routed traffic, the home operator has highest priority.

Now will be described example embodiment 2 (a weight based scheme).

To handle the above described problems of dealing with conflicting or multiple applicable rules it is proposed to use a weighted approach to rule conflict resolution. This approach means that all applicable rules contribute more or less to the selection process, as the rules together, via an overall merging algorithm, produce a common result, which can be seen as the valid rule. With this approach different levels of preference (i.e. "how much" a certain access is preferred) can be expressed in rules and is consequently captured and reflected in the resulting access selection. Thus, the weighted approach allows a more nuanced evaluation of the available accesses during the access selection process than can be achieved with lists, priorities and precedence values. With this approach a suitable alternative to the term could be "evaluation function", because evaluates accesses is what a rule does.

Instead of pointing out an access, or even listing prioritized accesses, a rule produces a so-called rating value for each available access, with the access properties as input data.

The rating values produced for a certain access by all applicable rules are then merged to a total rating value for the concerned access. The access selection algorithm produces such a total rating value for all available accesses and then selects the access with the highest total rating value.

Using access properties instead of specific access types as input data to the rules and producing rating values instead of specific accesses as output data makes the approach very flexible and future proof, well prepared to cope with the introduction of new services, accesses, stakeholders and rules.

The solution also considers the impact of multiple simultaneously active applications, which effectively reduces the access resources that are available to each application. The solution does this by reducing the available bit rate of an access by the expected bit rate consumption of coexisting applications, when evaluating an access with an application specific rule.

The basic solution is also easily extended to simultaneous multi-access, allowing different accesses to be flexibly selected for simultaneous data flows of different applications. In essence each access-application combination (i.e. how applications are "distributed" to different access—one application per access or shared accesses or both) can be evaluated using the same process as for the access evaluation in the non-simultaneous multi-access (i.e. one access at a time) case.

Figure 10:
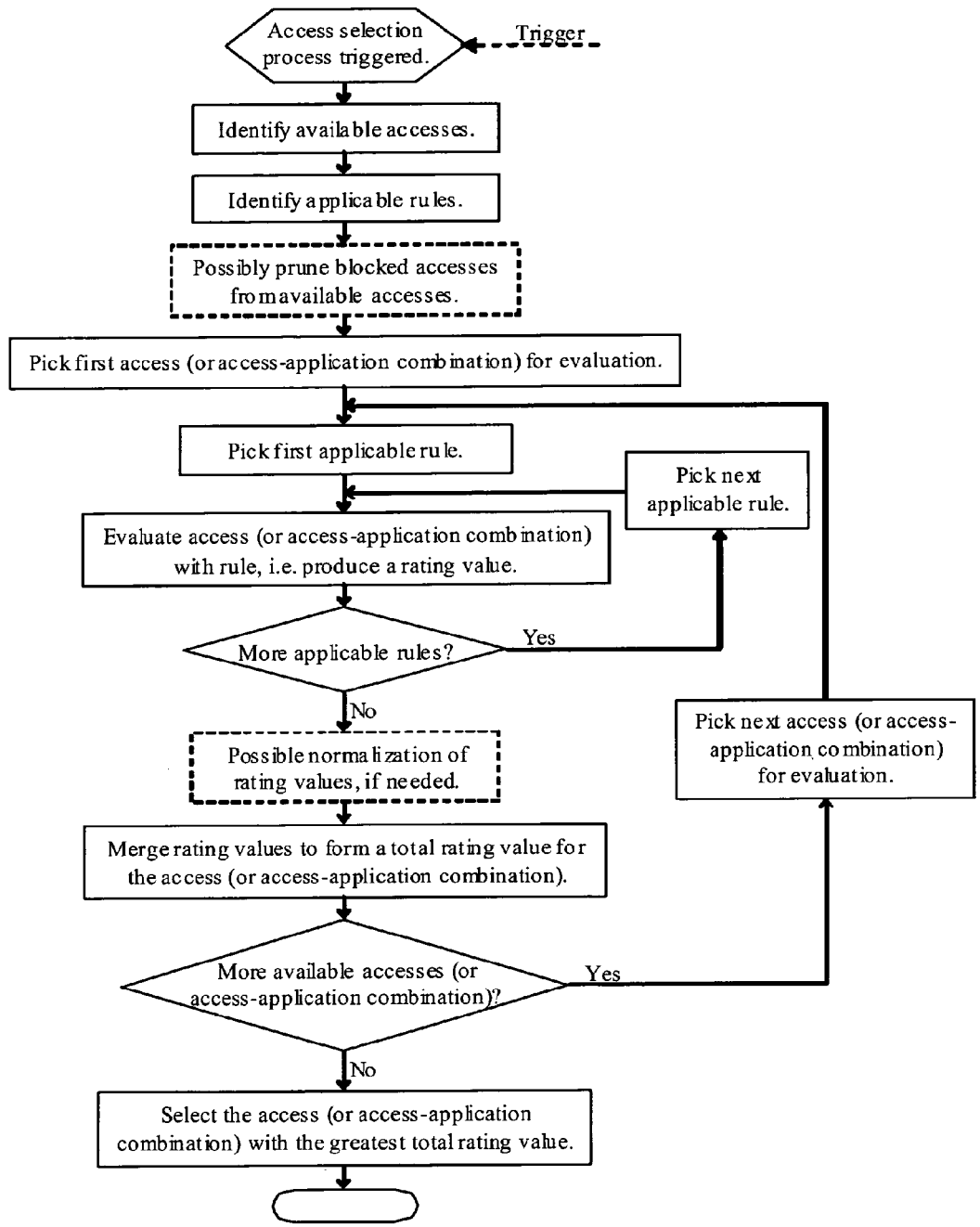
FIG. 10 is a schematic flowchart illustrating the access selection process according to the basic solution of embodiment 2.

A simple flow chart describing the basic solution is illustrated in FIG. 10.

Figure 3:
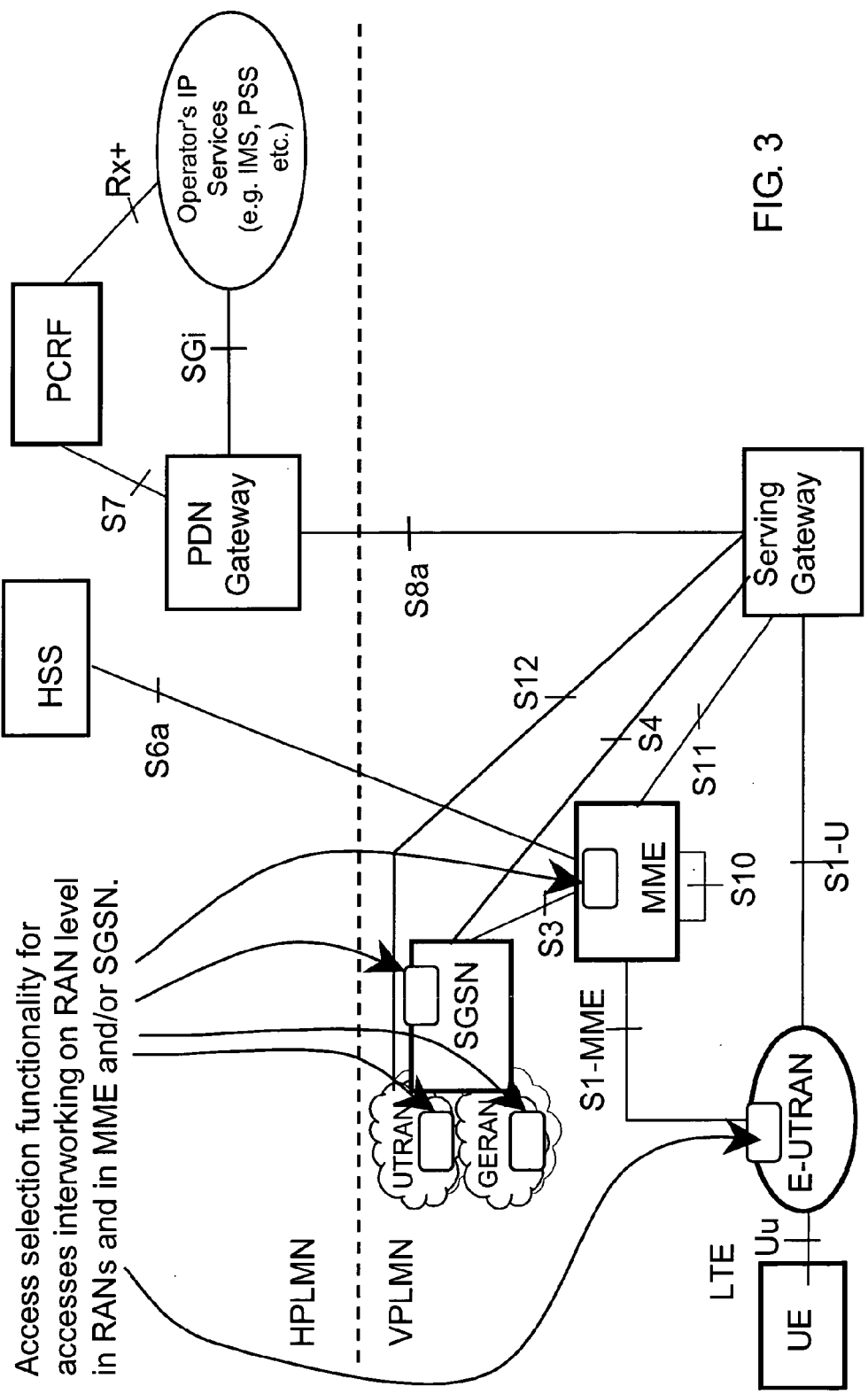
FIG. 3 illustrates access selection functionality for access interworking on a RAN level.
Figure 4:
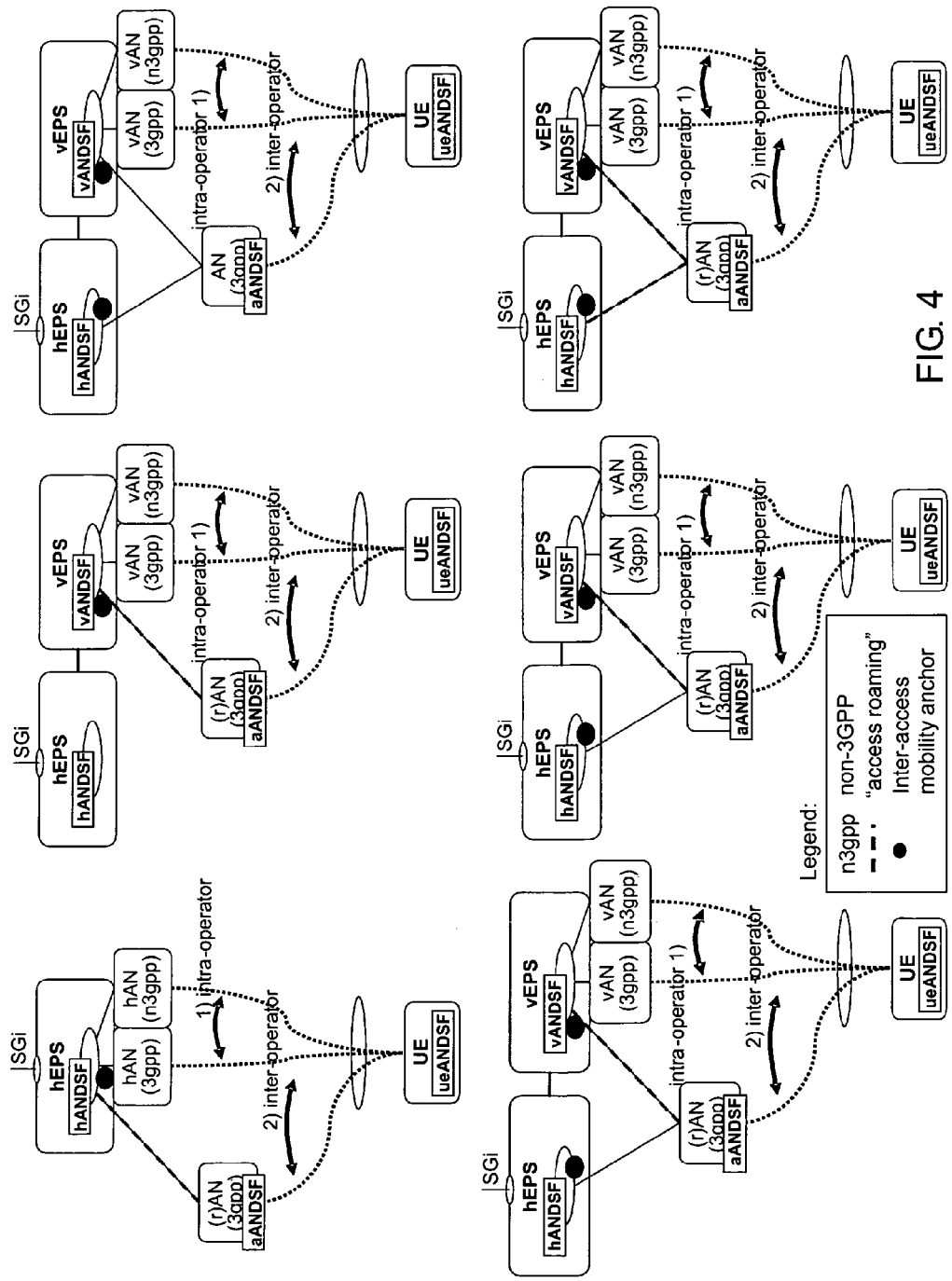
FIG. 4 illustrates some access selection scenarios, illustrating different examples of involved operators and cooperation constellations.

In the 3GPP System Architecture Evolution (SAE) architecture the solution would be located in the ANDSF—probably in the ueANDSF in the mobile node but possibly in the network based ANDSF (see FIG. 1). It could potentially also be useful in conjunction with selection between accesses interworking on the Radio Access Network (RAN) level in the SAE architecture, in which case it would be a part of the related network based functionality (see FIG. 3).

To handle the above described problems of dealing with conflicting or multiple applicable rules it is proposed to use a weighted approach to rule conflict resolution. This approach means that all applicable rules contribute more or less to the selection process, as the rules together, via an overall merging algorithm, produce a common result. With this approach different levels of preference (i.e. "how much" a certain access is preferred) can be expressed in rules and is consequently captured and reflected in the resulting access selection. Thus, the weighted approach allows a more nuanced evaluation of the available accesses during the access selection process than can be achieved with lists, priorities and precedence values. With this approach a suitable alternative to the term could be "evaluation function", because evaluates accesses is what a rule does.

In the inventive solution rules are defined and accesses are modeled/described in a generic way, so that the merging algorithm does not have to be rewritten/modified when new services, accesses, stakeholders or rules are introduced.

Each access type is modeled/described in terms of its properties, such as bit rate and roundtrip delay.

If an access type offers separate Quality of Service (QoS) classes, each QoS class may be modeled/described as a separate access type (and each QoS class provided by an access may be treated as a separate access of its own when an access is evaluated by the access selection process).

Accesses can also be individualized by including properties that are not access type specific in the model/description, such as operator and cost.

In this embodiment a rule is written as a function, using mathematical and/or logical expressions, which takes the properties of an access as its input data and produces a rating value as its output data. In addition to access properties a rule may take contextual data, such as location or time of day as input data. Every rule can be applied to each available access and thus produces a rating value for each available access.

All rules are not applicable in all access selection situations. What governs whether a rule is applicable or not can be called the rule's applicability condition. The applicability condition includes certain data has to match the current situation in order for the rule to be applicable. A rule is typically associated with a service/application, i.e. with a communication type, which means this must match the current communication (or communication to be started) in the mobile terminal in order for the rule to be applicable, but also contextual data like location or time of day may be included in the applicability condition.

It is also possible to include typical applicability condition parameters, such as location and time of day (and even application), as input parameters in the rules, so that e.g. the location or time of day significantly impacts the rating values produced by the rule. This way it may be possible to reduce, or even eliminate, the process of identifying applicable rules.

In general, each stakeholder may produce a rule for each relevant application (and contextual situation if desired). A stakeholder may also produce default rules (either a single generic one or one for each contextual situation), which are applied when none of the application specific rules is applicable to the current application.

In a special case of this general scenario, the stakeholders produce only default rules, i.e. no application specific rules. Instead, the current application (or possibly the developer of the current application) itself can be added as a stakeholder, i.e. the current application would have one or more rules associated with it. The application's rules could be written by the application developer or any other party (If the application's rule(s) is(are) written by one of the other stakeholders, the special case turns into a more general case with application specific stakeholder rules and without the application (or application developer) as a stakeholder in itself).

In an access selection situation the access selection process first identifies the applicable rules, i.e. those whose applicability conditions, e.g. application, location and/or time of day, match the current situation. The applicable rules may originate from multiple stakeholders, but multiple applicable rules may also originate from a single stakeholder. The access selection process also identifies the available accesses, so that unavailable accesses need not be evaluated.

Then the merging algorithm is applied to the applicable rules to produce a merged rule from which an overall access selection result can be derived. In the illustration of how this is done the following notation is used:

SX Stakeholder X, e.g. S1, S2, S3 . . .

$A_Z$ The available access Z. For example, if there are three available accesses, these accesses are denoted $A_1$, $A_2$ and $A_3$.

$P_X(A_Z)$ Relevant property X of access Z. For example, if access 1 has three relevant properties in its model/description, then these properties are denoted $P_1(A_1)$, $P_2(A_1)$ and $P_3(A_1)$. Relevant properties could be e.g. supported bit rate, roundtrip delay, operator, etc.

$C_x$ Contextual data X. If, for example, the relevant contextual data consists of location and time of day, then these two parameters are denoted $C_1$ and $C_2$.

f( ), g( )$_1$, g( )$_2$, . . . Different functions, consisting of mathematical and/or logical expression(s), producing numeric values as their respective results.

$R_{SX-Y}(A_Z)$ The rating value for access Z produced by applicable rule Y from stakeholder X. For example, if stakeholder 1 has produced two applicable rules, stakeholder 2 has produced three applicable rules and stakeholder 3 has produced one applicable rule, then the rating values produced by these rules for access 1 are denoted respectively $R_{S1-1}(A_1)$, $R_{S1-2}(A_1)$, $R_{S2-1}(A_1)$, $R_{S2-2}(A_1)$, $R_{S2-3}(A_1)$ and $R_{S3-1}(A_1)$.

$R_{N-SX}(A_Z)$ The normalized rating value for access Z produced by the applicable rules from stakeholder X. For example, if stakeholders 1 and 2 have produced applicable rules, then the normalized rating value for access 1 for the respective stakeholders are $R_{N-S1}(A1)$ and $R_{N-S2}(A1)$.

$R_{RFM-X}(A_Z)$ The rating value ready for merger X for access Z. For example, if three rating values ready for merger have been produced for access Z, then these values are denoted $R_{RFM-1}(A_Z)$, $R_{RFM-2}(A_Z)$ and $R_{RFM-3}(A_Z)$.

$R_{tot}(A_Z)$ The total rating value for access Z (produced by merging the rating values ready for merger for access Z).

The merging algorithm begins with an evaluation of each available access with each applicable rule. That is, each applicable rule is processed to produce a rating value for each available access, i.e. $R_{S1-1}(A_1)$, $R_{S1-2}(A_1)$, $R_{S2-1}(A_1)$, $R_{S1-1}(A_2)$, $R_{S1-2}(A_2)$, $R_{S2-1}(A_2)$, etc.

If, in a multi-stakeholder access selection situation (i.e. when the applicable rules originate from more than one stakeholder), a single stakeholder has produced multiple applicable rules, then the multiple rating values that this stakeholder's rules have produced for each access may make this stakeholders influence of the access selection unproportionally great. Therefore it may be beneficial to let the merging algorithm normalize these rating values. The normalization procedure may consist of:

calculating the average of the rating values (produced by rules from the same stakeholder) for each access, i.e. the normalized rating value for access Z from the m applicable rules from stakeholder X is calculated as $$R_{N-SX}(A_Z) = \frac{1}{m}\sum_{i=1}^{m} R_{SX-i}$$

selecting the maximum rating value (produced by rules from the same stakeholder) for each access, i.e. the normalized rating value for access Z from the m applicable rules from stakeholder X is calculated as $$R_{N-SX}(A_Z) = MAX[R_{SX-i}]_{i=1}^{m}$$

doing nothing (i.e. no normalization).

Which of the above options for the normalization phase that is the most appropriate depends on the kind of rules that turns out to be common. If multiple application specific rules (e.g. distinguished by different, but overlapping, contextual conditions) from the same stakeholder apply, then one of the two first normalization options (i.e. average or maximum) is probably the most sensible choice, in order to make the different stakeholders' influence proportional. However, if multiple default (application-wise) rules apply (e.g. default rules for different, but overlapping, contextual situations), there may be no reason to assume that the rules will favor the same access(es) (i.e. "pull in the same direction") and hence the third normalization option (i.e. no normalization at all) may be preferable. Whichever option that is used, the stakeholders have to adapt their rule writing accordingly.

The normalized (or non-normalized if that option is chosen) rating values make up the set of rating values ready for merger for each access, i.e. the set of $R_{RFM}$ values for each access. That is . . .

If normalized rating values are produced then the set of $R_{RFM}$ values for access 1 are:

$$[R_{RFM-1}(A_1)=R_{N-S1}(A_1), R_{RFM-2}(A_1)=R_{N-S2}(A_1), R_{RFM-3}(A_1)=R_{N-S3}(A_1) \ldots ]$$

Else if no normalization is used then the set of $R_{RFM}$ values for access 1 are:

$$[R_{RFM-1}(A_1)=R_{S1-1}(A_1), R_{RFM-2}(A_1)=R_{S1-2}(A_1), R_{RFM-3}(A_1)=R_{S2-1}(A_1), R_{RFM-4}(A_1)=R_{S2-2}(A_1), R_{RFM-5}(A_1)=R_{S3-1}(A_1) \ldots ]$$

The merging algorithm then merges the rating values ready for merger (i.e. the set of $R_{RFM}$ values) by producing a total rating value for each access. There are two straightforward processes for this merger:

1. Addition:

$$R_{tot}(A_Z) = \sum_{i=1}^{M} R_{RFM-i}(A_Z)$$

where M is the number of $R_{RFM}$ values.

2. Multiplication:

$$R_{tot}(A_Z) = \prod_{i=1}^{M} R_{RFM-i}(A_Z)$$

where M is the number of $R_{RFM}$ values.

Finally, the merging algorithm selects the access with the greatest total rating value, i.e. the merging algorithm selects the access that satisfies the following:

$$R_{tot}(A_{selected}) = MAX[R_{tot}(A_i)]_{i=1}^{Amax}$$

where Amax is the number of available accesses.

As mentioned above a rule is expressed as a function, using mathematical and/or logical expressions, which takes the properties of an access, and possibly contextual data, as its input data and produces a rating value as its output data. Associated with each rule there may be an applicability condition. More formally rule Y from stakeholder X can be expressed as follows:

$$\{R_{SX\text{-}Y}(A_Z)=f(P_1(A_Z),P_2(A_Z),P_3(A_Z),P_4(A_Z),C_1,A_Z);$$
$$<\text{applicability condition}>\}$$

where e.g.

$$f(P_1(A_Z),P_2(A_Z),P_3(A_Z),P_4(A_Z),C_1)=g_1(P_1(A_Z))<op>g_2$$
$$(P_2(A_Z))<op>g_3(P_3(A_Z))<op>g_4(P_4(A_Z))<op>g_5$$
$$(C_1,A_Z)$$

where $<op>$ represents any operation, e.g. $+$, $-$, $\times$ or $\div$.

$P_1(A_Z)$ could e.g. be the maximum bit rate of access Z, $P_2(A_Z)$ could be the expected roundtrip time, $P_3(A_Z)$ could be the expected jitter, $P_4(A_Z)$ could be the cost of using access Z (or some other relevant property of access Z), $C_1$ could be the location and $g_5(C_1, A_Z)$ could be e.g. $g_5(C_1, A_Z)=\{\text{IF } C_1=\text{location X AND } A_Z=A_2 \text{ THEN RETURN 2 ELSE RETURN 1}\}$.

The following is an example of a possible evaluation function of a rule:

$$R = \left(\arctan\left(\frac{8}{900} \times (BitRateKbps - 550)\right) + \arctan\frac{44}{9}\right) \times \times$$
$$\left(0, 5 + \left\{\begin{array}{l}\text{IF operator} == \text{``OperatorA''} \\ \text{THEN RETURN 0, 25 ELSE RETURN 0}\end{array}\right\}\right) \times \times maxValue$$

Another possible, and rather simple and convenient, way to represent a function, e.g. of the form $y=f(x)$, could be to provide explicit values for a few $(x, y)$-pairs and assume straight lines (i.e. linear functions) between them.

This approach to rule writing (taking access properties rather than explicit access type as input data) makes the rules in principle agnostic to the access types. This is an attractive property, because it means that a rule can be applied for evaluation of basically any access during the access selection procedure. The rule does not have to be rewritten when new access types are introduced, which simplifies rule management and makes the approach rather future proof.

Absolute blocking or mandating of an access can be implemented through special rating values, such as 0, −1 or <0 (e.g. for multiplication-merging) or positive or negative values close to the max-range-values (e.g. for addition-merging). Alternatively, a special indication, e.g. in the form of a special type of rule can be used. Such a blocking rule could make the access selection process bypass (disregard) the indicated access. Mandating an access is trickier, because different stakeholders may mandate different accesses. If absolute mandating or an access is to be allowed, the stakeholders must be given different priorities.

The blocking mechanism can be used dynamically, e.g. by designing the (mathematical or logical) functions of a rule such that the rating value produced by the rule evaluates to a dedicated rating value, e.g. 0, when a certain condition is met, e.g. that the bit rate offered by the access is below a certain threshold or that the operator of the access does not belong to a set of preferred operators.

The potential impact on the (application specific) rules and the access selection process in general of simultaneously active applications needs special consideration.

When multiple applications are active simultaneously, the bandwidth available to each application is reduced. Hence, the normally preferred access for a certain application may no longer be suitable, when shared with other application(s). In this situation an access with a greater bandwidth than the normally preferred one may be a better choice.

The application specific rules are not written with coexistence of other applications in mind. This would not be practically feasible, since the number of potential coexistence scenarios is unforeseeable, but certainly great. The above described concept for rule writing, however, has a property that allows the rules to be used without modification also in application coexistence scenarios. This property is that the rules are in principle access agnostic in the sense that the input data to the rating value calculations consists of the properties of the accesses—not the access types.

This allows an approach where the access selection process modifies the descriptions of the access properties before they are fed into the rating value calculations, in order to take into account the impact of multiple coexisting active applications.

To assess the impact of applications on each other the access selection functionality needs some information about the properties of the application:

The bit rate that the application expects to consume.
The QoS the application desires/expects.

This information should be known from application signaling, e.g. Session Initiation Protocol (SIP) signaling, or configuration data. Alternatively, the information can be provided together with the application specific rules (i.e. when an application specific rule is written this application specific data is associated with the rule). If the expected/desired QoS for a certain application is not available for a certain access, the access selection functionality reduces the expected/desired QoS, most likely to best-effort, when the access is evaluated for rules specific to the other coexisting application(s). Furthermore, if the application information is unknown for an application, the access selection functionality can consider it as a best effort application with a default bit rate consumption (or simply not consider it at all when assessing the impact of simultaneously active applications).

To make the rating value calculation reasonably well reflect the situation experienced by an application in a coexistence scenario, the access selection functionality uses the following modification of the previously described access selection process:

Before feeding the access properties into a rating value calculation of an application specific rule the access selection functionality reduces the nominal bit rate by the expected bit rate consumption of all other applications sharing the access, which has a desired/expected QoS with equal or higher priority than the concerned application.

With this modification an application specific rule will in essence evaluate only the access conditions that the application would experience in the current situation (instead of the nominal properties of the access) and will thus produce a more appropriate rating value.

The presence of simultaneous multi-access has an impact only if multiple applications (or a single application with multiple data flows) are active. In such case the access selection functionality has the choice to direct different applications (or different data flows) over different accesses or over the same (shared) access.

If, for example, three accesses are available and three applications (or data flows) are active, then the following $3^3=27$ alternative access-application combinations are possible (the number of access-application combinations, $N_{acc\text{-}app\text{-}comb}$, depends on the number of available accesses, X, and the number of simultaneously active applications, Y, according to $N_{acc\text{-}app\text{-}comb}=X^Y$):

Access-application combinations for three accesses and three applications

|  | Access 1 | Access 2 | Access 3 |
|---|---|---|---|
| Acc-app combination 1 | App 1 App 2 App 3 | | |
| Acc-app combination 2 | App 2 App 3 | App 1 | |
| Acc-app combination 3 | App 2 App 3 | | App 1 |
| Acc-app combination 4 | App 1 App 3 | App 2 | |
| Acc-app combination 5 | App 1 App 3 | | App 2 |
| Acc-app combination 6 | App 1 App 2 | App 3 | |
| Acc-app combination 7 | App 1 App 2 | | App 3 |
| Acc-app combination 8 | App 1 | App 2 | App 3 |
| Acc-app combination 9 | App 1 | App 3 | App 2 |
| Acc-app combination 10 | App 2 | App 1 | App 3 |
| Acc-app combination 11 | App 2 | App 3 | App 1 |
| Acc-app combination 12 | App 3 | App 1 | App 2 |
| Acc-app combination 13 | App 3 | App 2 | App 1 |
| Acc-app combination 14 | | App 1 App 2 App 3 | |
| Acc-app combination 15 | App 1 | App 2 App 3 | |
| Acc-app combination 16 | | App 2 App 3 | App 1 |
| Acc-app combination 17 | App 2 | App 1 App 3 | |
| Acc-app combination 18 | | App 1 App 3 | App 2 |
| Acc-app combination 19 | App 3 | App 1 App 2 | |
| Acc-app combination 20 | | App 1 App 2 | App 3 |
| Acc-app combination 21 | | | App 1 App 2 App 3 |
| Acc-app combination 22 | App 1 | | App 2 App 3 |
| Acc-app combination 23 | | App 1 | App 2 App 3 |
| Acc-app combination 24 | App 2 | | App 1 App 3 |
| Acc-app combination 25 | | App 2 | App 1 App 3 |
| Acc-app combination 26 | App 3 | | App 1 App 2 |
| Acc-app combination 27 | | App 3 | App 1 App 2 |

Hence, the access selection functionality must not only select an access, but one out of all possible access-application combinations. To do this the access selection process evaluates each access-application combination by producing rating values and a total rating value (as previously described for non-simultaneous multi-access) and selects the access-application combination with the highest total rating value. The only difference from the non-simultaneous multi-access case is that access-application combinations instead of accesses are evaluated.

Since the number of access-application combinations grows rapidly with the number of accesses and applications, the access selection functionality may choose to prune the set of access-application combinations to be evaluated, e.g. by disregarding access-application combinations that are clearly unsuitable. The access selection functionality may for instance disregard access-application combinations which suggest running an application over an access which does not offer the QoS that the application expects/desires or for which the available bit rate is way below the expected bit rate consumption of the (combined) application(s). However, if such pruning would result in that all (or almost all) access-application combinations were disregarded, then the access selection functionality may have to reconsider and re-include the least bad-looking ones of the pruned access-application combinations into the set of access-application combinations to be evaluated.

How great impact on the access selection that it is reasonable that an application specific rule has depends on the application and how important the application is considered to be. This aspect may easily be reflected in the produced rating values. That is, rules specific to an—in this context—unimportant application should, if this kind of differentiation is desired, generally produce smaller rating values with smaller spread between accesses than should rules specific to applications that are considered more important.

There are however other ways to achieve the same effect. Instead of, or combined with, the above described differentiated rating value production an overall mechanism or rule could be used to give different application specific rules different weights in the access selection process. This mechanism could for instance be controlled by the user. The means to achieve this is to modify the rating value produced by application specific rules, e.g. by specifying a factor (e.g. denoted application specific factor) by which the rating value is multiplied before the total rating value is calculated. This could be formulated as a generally applicable mechanism/instruction e.g. of the following form:

Multiply the rating value produced by any application specific rule by the application specific factor F, where F depends on the application according to the following table:

| Application | F |
|---|---|
| App X | 0.4 |
| App Y | 0.7 |
| App Z | 0.9 |
| App Q | 1.2 |
| App R | 1.6 |
| App S | 2.5 |
| All other applications | 1 |

The above described solution (example embodiment 2), in which each applicable rule impacts the result of the access selection and in which the sizes of a rule's produced rating values determines how great the rule's impact is, can be combined with other approaches to rule merging and/or rule conflict resolution (e.g. other example embodiments).

The inventive solution can also be combined with an actor-based priority approach, such as the one described in example embodiment 1. With an actor-based priority approach each possible source of a rule (i.e. each stakeholder or "actor"), e.g. home operator, visited operator and user, is given a certain actor priority. This means that if for instance the home operator has the highest actor priority, then all the home operators' rules will override rules from all other actors.

Combined with such an approach the inventive solution would be used as previously described, but before applying it the set of applicable rules would be pruned of the rules from all actors/stakeholders with a lower actor priority than the one(s) with the highest actor priority (among the set of actors/stakeholders which have provided at least one applicable rule in the current situation).

Another possible use of actor-based priorities is that when application specific rules are used, the actor priorities are evaluated per application. That is, if two applications, app A and app B, are active, then the access selection functionality identifies the source of the highest priority applicable application specific rule(s) separately for the two applications. Assume, for instance, that the home operator has the highest actor priority and that the home operator has provided an application specific rule for app A, but none for app B. If on the other hand another actor with lower priority, e.g. the user, has provided an access specific rule for app B, then both these rules (i.e. the one from the home operator and the one from the user) are regarded as applicable in the access selection situation and both are consequently used to evaluate the available accesses according to the previously described procedure.

The inventive solution can also be combined with rule priorities in general, irrespective of whether the priority is associated directly with the rule or indirectly via e.g. its source's actor priority. A quite different approach than the one described in conjunction with actor-based priorities may be used.

This other approach for combining the weighted approach with priorities is based on scaling or shifting of the rating values produced by the rules, wherein the applied scaling or shifting is based on each rule's respective priority. With this approach a rule should be written such that the rating value it produces always falls within a given range, e.g. $R_{min}$-$R_{max}$, which range is common for all rules. If a rating value, R, is outside this range the rating value should either be discarded or somehow transformed into the stipulated range (e.g. by assigning it the value $R_{min}$ or $R_{max}$, whichever is the closest).

Assume then that each rule is also given a priority, P, in the range 1-$P_{max}$ (assuming that priorities are defined such that the higher the priority value the greater is the rule's importance). Then the priority, P, assigned to each rule is used to scale or shift the rating value (and in practice the potential value range) produced by the rule.

When scaling is used, $R_{min}$ is set to 0, whereas the choice of $R_{max}$ is less important. A simple way to use the priorities for scaling of rating values is to multiply a produced rating value by the rule's priority, P, and a constant, k, i.e. such that the scaled rating value, $R_{scaled}$, becomes $R_{scaled}$=R×k×P. This also means that the rule's potential rating value range is scaled to a scaled rating value range being 0-$R_{max}$×k×P.

If shifting is used, a simple way to use the priorities is to let a priority indicate how much the rating value range of a rule should be shifted, such that the shifted rating value ranges of rules with different priorities end up non-overlapping. For example (using the rating value range $R_{min}$-$R_{max}$ and the priority range 1-$P_{max}$) the value (P−1)×($R_{max}$−$R_{min}$) could be added to the rating value produced by a rule, i.e. $R_{shifted}$=R+(P−1)×($R_{max}$−$R_{min}$), thereby effectively shifting the rule's rating value range to range from $R_{min}$+(P−1)×($R_{max}$−$R_{min}$) to $R_{max}$+(P−1)×($R_{max}$−$R_{min}$). (If $R_{min}$=0, the shifted rating value range becomes (P−1)×$R_{max}$ to P×$R_{max}$.)

The rating value ranges may also be shifted such that they are partially overlapping, e.g. by adding the value (P−1)×($R_{max}$−$R_{min}$)/2 to each produced rating value, i.e. $R_{shifted}$=R+(P−1)×($R_{max}$−$R_{min}$)/2. The shifted rating value ranges for different priorities would then become:

| | |
|---|---|
| P = 1: | $R_{min}$ to $R_{max}$ |
| P = 2: | $R_{min}$ + ($R_{max}$ − $R_{min}$)/2 to $R_{max}$ + ($R_{max}$ − $R_{min}$)/2 |
| P = 3: | $R_{max}$ to 2 × $R_{max}$ − $R_{min}$ |
| . | . |
| . | . |
| P = $P_{max}$ | $R_{min}$ + ($P_{max}$ − 1) × ($R_{max}$ − $R_{min}$)/2 to $R_{max}$ + ($P_{max}$ − 1) × ($R_{max}$ − $R_{min}$)/2 |

With $R_{min}$=0 these shifted rating value ranges becomes:

| | |
|---|---|
| P = 1: | 0 to $R_{max}$ |
| P = 2: | $R_{max}$/2 to 3 × $R_{max}$/2 |
| P = 3: | $R_{max}$ to 2 × $R_{max}$ |
| . | . |
| . | . |
| P = $P_{max}$ | ($P_{max}$ − 1) × $R_{max}$/2 to ($P_{max}$ + 1) × $R_{max}$/2 |

A combination of shifting and scaling is also possible.

Now will be described example embodiment 3 (an access precedence based scheme). In this embodiment an access selection rule is referred to as a multi-access control rule (MACR). The format of the MACRs used in this embodiment is described above in the section relating to example embodiment 1 (precedence based scheme).

The methods described in this embodiment are to be used as the rule merging function, $g_v(x)$.

As a baseline this embodiment uses a rule format in which a MACR includes the following:

A precedence value.

A precedence list, that is a strictly ordered (in order of preference) list of acceptable accesses. This is sometimes referred to as the accept list.

The embodiment is then enabled by extensions to this baseline MACR format. Through these extensions it is possible to provide more precise descriptions of what a MACR action is. Using this extra information it is possible to develop an algorithm that can merge the behaviour of several MACR actions.

This conflict resolving technique is based on the observation that most triggers of rules, e.g. starting services, do not generally need to order the accesses strictly, they merely want to divide them into categories. An application might be able to handle streams of both high and low bandwidth. This rule must then divide the accesses into two categories.

This can be generalized in the way that the accesses can be ordered into groups. Every such group has an order from 0 to infinity. The word "order" will be used in this embodiment to identify which position in the list an element or a group of elements has.

If we now want to create a rule for the scenario with the application above it can be done by defining two orders, 0 and 1. All accesses that are capable of the high bandwidth stream will be of order 0. All accesses that are not capable of the high bandwidth stream, but still can manage the low bandwidth stream will be of order 1. Accesses that are not capable of any of the two streams will not be in any order.

Changes to MACR format: The change is very simple. Instead of keeping a strictly ordered list of accesses a number of accesses may share the same order.

Figure 11:
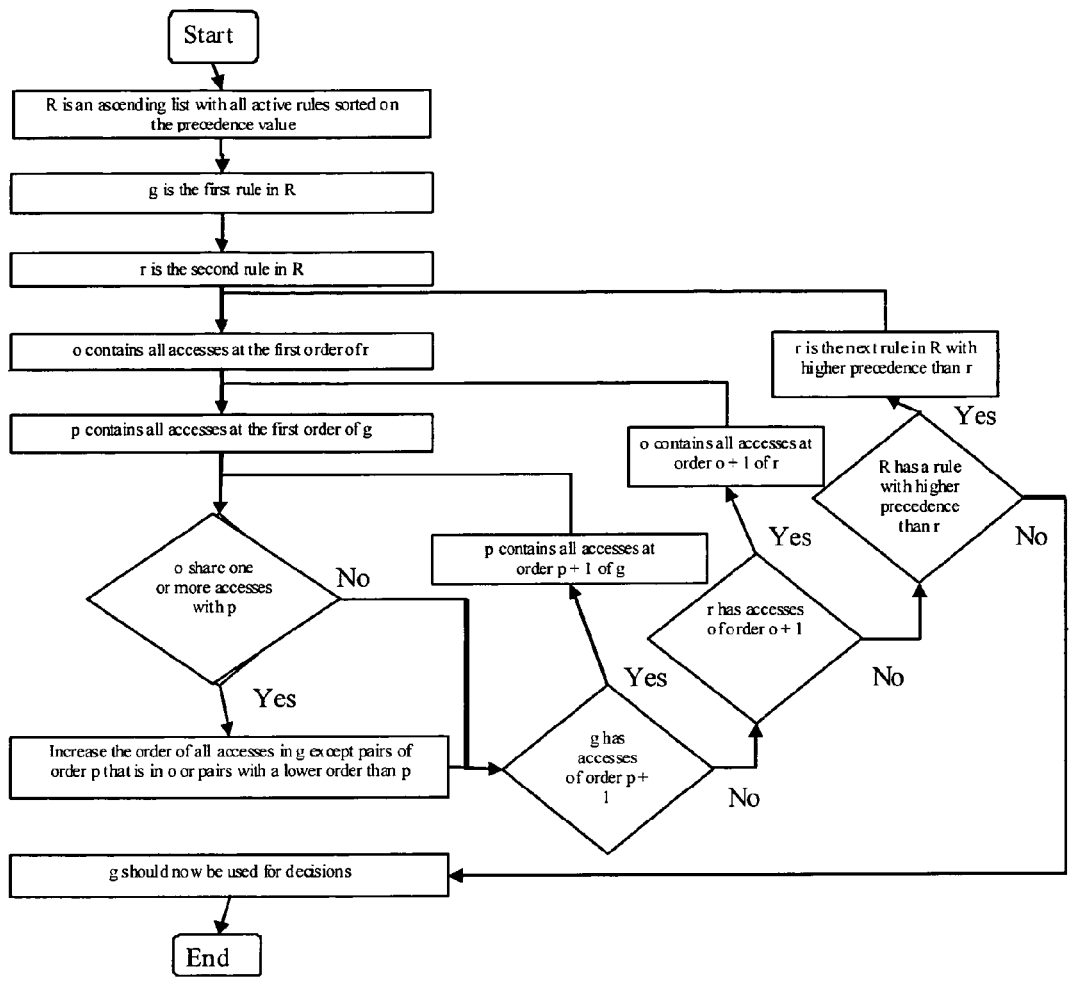
FIG. 11 illustrates conflict resolution by rule merging in accordance with embodiment 3.

When several rules are simultaneously active, it is important that the rule with the lowest precedence still fully decides which access that should be used. On the other hand, if the rule with lowest precedence points out several usable accesses any of these can be used without conflicting with the rule. That gives the opportunity for the system to let other rules influence the decision. The following method does this in such a way that the internal order of interfaces in the rule with lowest precedence is preserved. FIG. 11 illustrates conflict resolution by rule merging.

Two active rules from different actors might have completely disjoint sets of accesses in their accept lists. Due to the way MACRs are specified, e.g. by each actor, the accesses might be regarding accesses/networks that the other actor have no prior knowledge of. These accesses might still be useful for the rule from the other actor.

This method merges all active rules in precedence order to give all actors a possibility to influence the decision.

Changes to MACR format: When merging the rules the basic semantic of the MACR is altered. An actor can no longer be sure that when his rule trigger, decisions will be made according to this rule. While it is not possible to fully fix this, it is possible to introduce an extra list to the rule that gives the actors the ability to deny certain accesses to be merged with the rule. We will call this the deny list. This list can contain wildcards to e.g. block all accesses except the ones in the rule itself. This way an actor can leave the deny list empty for rules of lower importance and block everything for rules with high importance.

Figure 12:
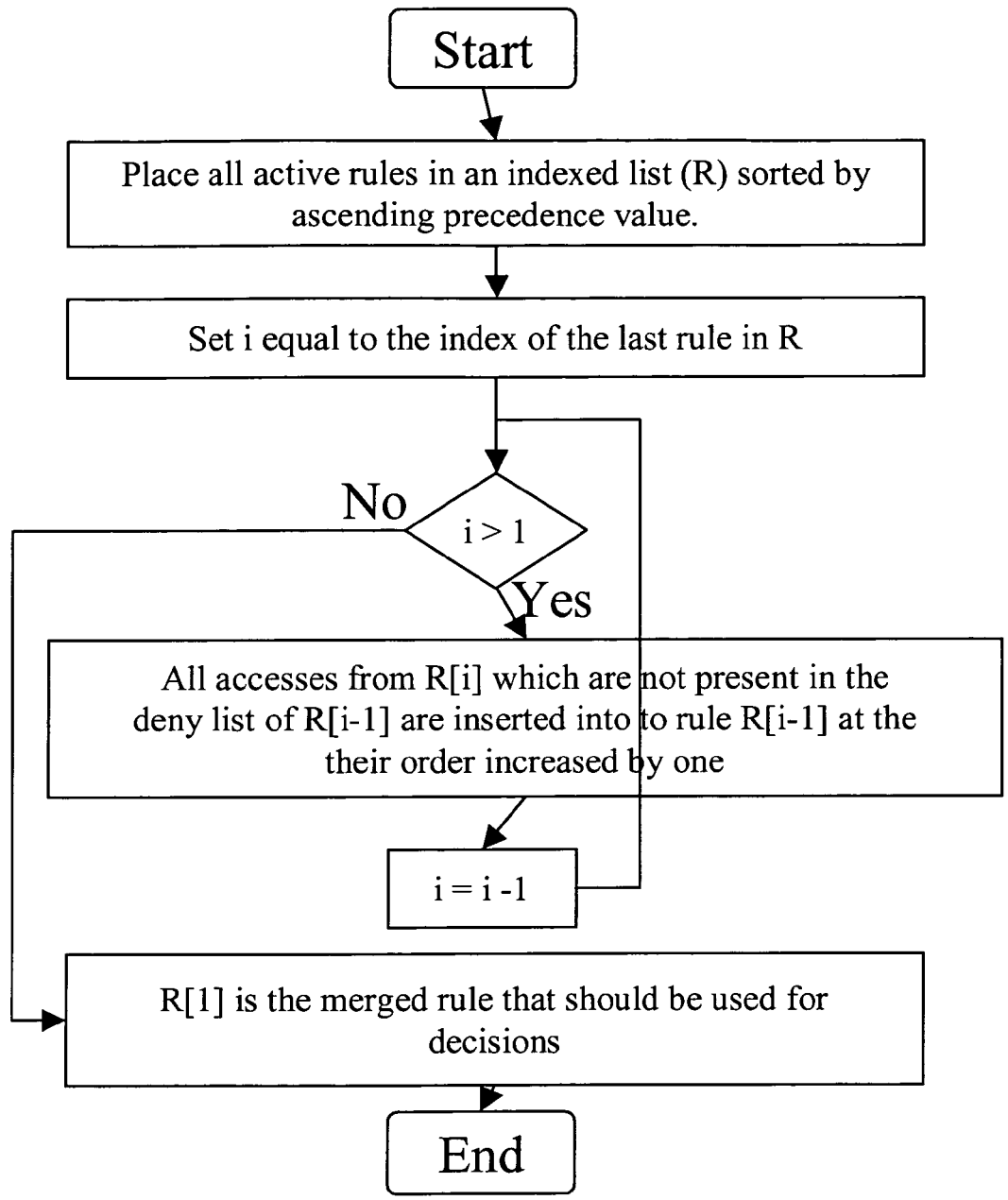
FIG. 12 illustrates a method according to embodiment 3 of the present invention.

The following method, illustrated in FIG. 12, will merge all rules starting with the rule that has the highest precedence value. For every merge the rule with higher precedence will be given a penalty of one order, that is the order of all accesses of that rule will be increased with one.

When handling rules that are triggered by the activation of a service extra care needs to be taken. A service should not be allowed to start if the chosen access is not in the accept list of the rule and matches the deny list of the rule. This way services can be managed in a way so that they may not run on e.g. other networks than the service provider's network.

The precedence for the accept and deny lists should be distributed among the actors in the system. This should be done in a way so that it may reflect the roaming agreements between actors. The flexibility of this system is big but an example of how this can be used is the following simple scenario.

We have two actors, the home operator and the visited operator. The home operator is allowed to use the precedence values 0-100 and the visited operator is allowed to use precedence 50-150. This way it is possible for the home operator to both specify rules that always overrule the visited operator and rules that can be overruled by the visited operator.

The different orders that are available in the lists should also be agreed upon between the operators. E.g. order zero can be used for well suited accesses, order one can be used for usable accesses. Not usable accesses should of course be put in the deny list. Keeping a limited number of orders helps the algorithm to perform well.

Now will be described example embodiment 4 (an access priority based scheme). This embodiment is rather similar to example embodiment 3. The described method is to be used as the rule merging function, $g_v(x)$.

This scheme is easier to explain and implement if principles for precedence and order values, as used in example embodiment 3, are reversed, i.e. that a more important rule has a higher value than less important rules and that a preferred access has a higher value than less preferred accesses. In order to avoid confusion these values are called priorities (instead of precedence and order):

The importance of a rule is reflected in the rule's priority Pr.
The higher Pr the more important is the rule. Multiple rules may have the same Pr value.

The preference of an access (within a rule) is reflected in the access's priority Pa. The higher Pa the more preferred is the access.

So, every rule has a priority Pr and within each rule there is a set of selectable accesses, each given a priority Pa from anywhere in the Pa range. Accesses in the rule may have the same or different Pa values.

Deny lists can be used as in example embodiment 3.

Hence, in this embodiment a rule consists of:
A rule priority, Pr.
A list of accesses, each with an associated access priority, Pa.
Optionally a deny list as in example embodiment 3.

When creating a merged set of selectable accesses from the set of active rules each rule's priority (Pr) is added to the access' priority (Pa) within the rules access list, thereby giving it a modified priority value, which can be called "merger priority", Pm. If the same access appears in multiple rules, the Pm values produced for this access are added together to a new Pm value.

Figure 13:
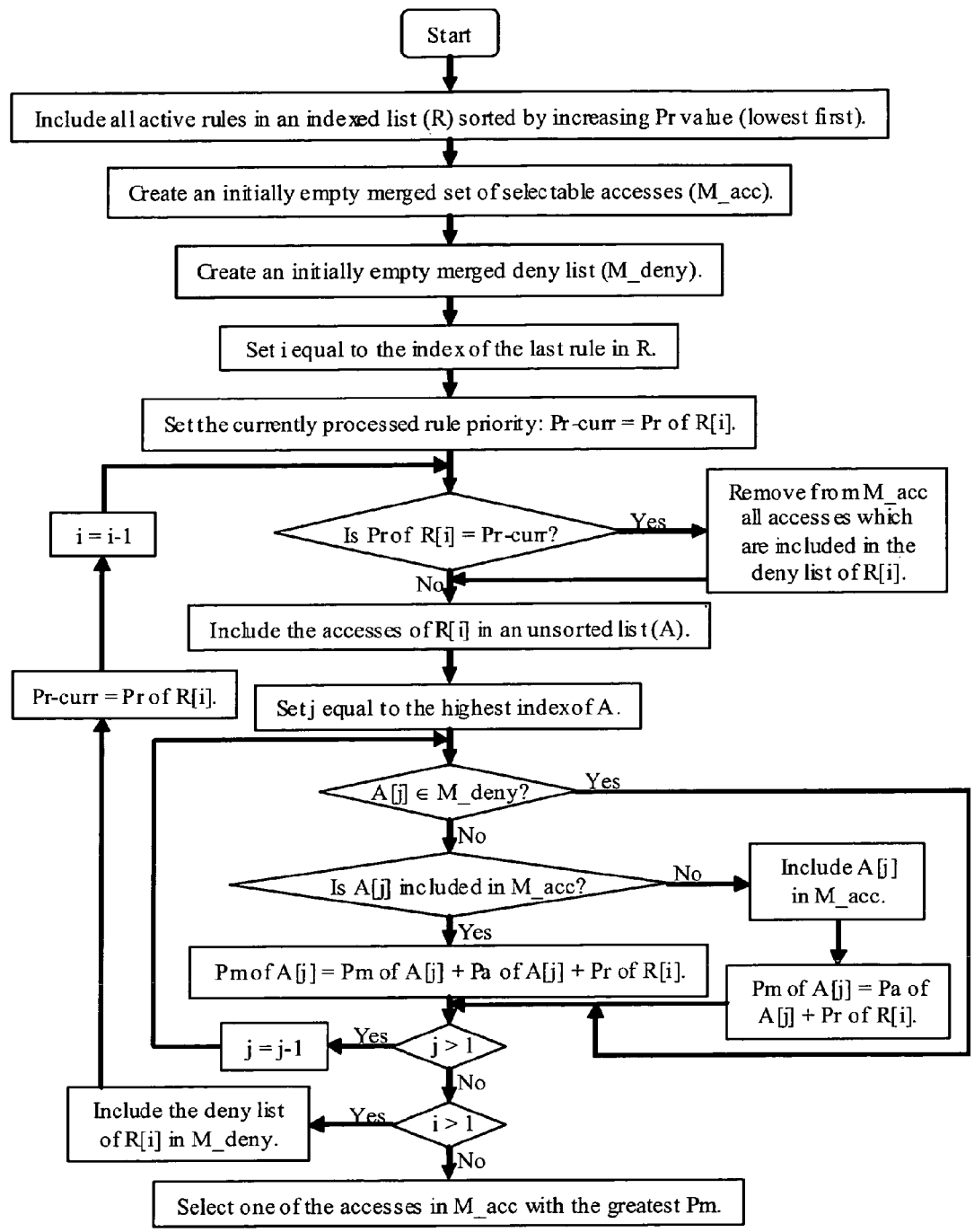
FIG. 13 is a schematic flowchart illustrating the rule merging and access selection scheme of example embodiment 4.

The result of this merging process is a set of selectable accesses, each with an associated priority value Pm. The one with the greatest Pm value is selected. The method is illustrated in more detail in FIG. 13.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form. It will also be appreciated that the invention may be embodied in a physical apparatus or tangible product.

The invention claimed is:

1. A method implemented by a communications device operative in a communications network in which a plurality of accesses are available to a user entity for accessing a network resource, comprising:
    determining a set of active rules, each rule specifying respective first preferences, at least relatively, for at least some of the plurality of accesses, the rules of the set being potentially in conflict between each other concerning which access is most preferred;
    deriving by the device from the set of active rules a new rule specifying respective second preferences, at least relatively, for at least some of the plurality of accesses by combining the specified respective first preferences of the active rules according to a predetermined scheme to generate the new rule, wherein the active rules are assigned respective priority values and the respective first preferences specified by the active rules are represented by first preference values, and wherein the new rule is derived by weighting the first preference values specified by the active rule based on the respective assigned priority values and combining the weighted preference values; and
    selecting an access for use by the user entity based on the second preferences specified by the new rule.

2. The method of claim 1, further comprising:
accessing the network resource using the selected access.

3. The method of claim 1, further comprising:
scanning for the selected access.

4. The method of claim 3, further comprising:
performing the deriving, selecting and scanning steps for a plurality of sets of active rules.

5. The method of claim 1, wherein one of the preference values is set to one, and the other preference values are or the other preference value is set to zero.

6. The method of claim 5, wherein one of the priority values assigned to the active rules is set to one, and the other priority values are or the other priority value is set to zero.

7. The method of claim 1, further comprising determining the first preference values from properties of the respective associated accesses.

8. The method of claim 1, wherein deriving a new rule comprises deriving the new rule based only on those accesses of the plurality that are considered to be acceptable accesses for all of the active rules.

9. The method of claim 8, wherein deriving a new rule comprises deriving the new rule based on modified respective priority values for the active rules, the priority value modification for each active rule compensating for the non-consideration of at least one of the accesses for that active rule.

10. The method of claim 1, wherein deriving a new rule comprises deriving the new rule based only on those accesses of the plurality that are considered to be acceptable accesses for all of the active rules.

11. The method of claim 1, wherein the user entity comprises an entity selected from the group consisting of a user terminal; mobile node; mobile terminal; moving network; personal area network; and user network.

12. An apparatus operative in a communications network in which a plurality of accesses are available to a user entity for accessing a network resource, comprising:
a rule determining processing circuit operative to determine a set of active rules, each rule specifying respective first preferences, at least relatively, for at least some of the plurality of accesses, with potential for conflict between the rules of the set concerning which access is most preferred;
a new rule deriving processing circuit operative to derive from the set of active rules a new rule specifying respective second preferences, at least relatively, for at least some of the plurality of accesses by weighting first preference values of the active rules based on assigned priority values of the active rules, and combining the weighted first preference values, wherein the first preference values of the active rules represent the respective first preferences specified by the active rules; and
an access selection processing circuit operative to select an access for use by the user entity based on the second preferences specified by the new rule.

13. A non-transitory machine readable storage medium including program instructions operative to cause a processor in a node of a communications network, in which a plurality of accesses are available to a user entity for accessing a network resource, to perform the steps of:
determining a set of active rules, each rule specifying respective first preferences, at least relatively, for at least some of the plurality of accesses, the rules of the set being potentially in conflict between each other concerning which access is most preferred;
deriving from the set of active rules a new rule specifying respective second preferences, at least relatively, for at least some of the plurality of accesses, wherein deriving a new rule comprises weighting first preference values of each active rule based on an assigned priority value of each active rule, and combining the weighted first preference values, wherein the first preference values of the active rules represent the respective first preferences of the active rules; and
selecting an access for use by the user entity based on the second preferences specified by the new rule.

* * * * *